US012669083B2

(12) United States Patent
Dewis

(10) Patent No.: US 12,669,083 B2
(45) Date of Patent: Jun. 30, 2026

(54) SYSTEM FOR ENERGY STORAGE, COMPRESSION AND RECOVERY

(71) Applicant: Nova Nexus, LLC, New York, NY (US)

(72) Inventor: David W. Dewis, Bath, ME (US)

(73) Assignee: NOVA NEXUS, LLC, New York, NY (US)

( * ) Notice: Subject to any disclaimer, the term of this patent is extended or adjusted under 35 U.S.C. 154(b) by 0 days.

(21) Appl. No.: 19/032,900

(22) Filed: Jan. 21, 2025

(65) Prior Publication Data

US 2025/0237167 A1      Jul. 24, 2025

Related U.S. Application Data

(60) Provisional application No. 63/561,073, filed on Mar. 4, 2024, provisional application No. 63/623,568, filed on Jan. 22, 2024.

(51) Int. Cl.
*F02C 1/08* (2006.01)
*F15B 1/08* (2006.01)

(52) U.S. Cl.
CPC . *F02C 1/08* (2013.01); *F15B 1/08* (2013.01)

(58) Field of Classification Search
CPC .................................... F02C 1/08; F15B 1/08
See application file for complete search history.

(56) References Cited

U.S. PATENT DOCUMENTS 11,286,898 B2 * 3/2022 Novek .................... F03B 13/06
2007/0134141 A1 6/2007 Park et al.

2007/0231072 A1 10/2007 Jennings et al.
2012/0174569 A1 * 7/2012 Ingersoll ............... H02J 15/006
                                                        60/415
2013/0014529 A1 * 1/2013 Minds ..................... F25B 27/00
                                                        62/235.1
2018/0030978 A1 2/2018 McCarthy
2019/0107280 A1 * 4/2019 Boudreault .............. F23J 15/00
2019/0383260 A1 * 12/2019 Frye ........................ F03B 17/00
2023/0184384 A1 * 6/2023 Owen ........................ F17C 5/06
                                                        62/45.1

FOREIGN PATENT DOCUMENTS

EP            0645168 A1 * 3/1995 ......... B01D 19/0005

OTHER PUBLICATIONS

International Search Report and Written Opinion, United States Patent and Trademark Office, Application No. PCT/US2025/012418, Mar. 7, 2025.

* cited by examiner

*Primary Examiner* — Thomas E Lazo
(74) *Attorney, Agent, or Firm* — Gottlieb, Rackman & Reisman, PC

(57) ABSTRACT

A hydraulic compressor configured to increase the mass of gas to be compressed for a given flow of liquid and a method of the same. The gas can be pre-compressing in a compressor arranged upstream of an inlet system such that compressed air enters the inlet system before mixing with the liquid, thereby permitting an increased mass of gas per unit volume of liquid to be compressed by the hydraulic compressor arranged upstream of the inlet system. The compressed gas can be collected and stored, which can then be used to drive an expander to produce work.

19 Claims, 15 Drawing Sheets

SYSTEM FOR ENERGY STORAGE, COMPRESSION AND RECOVERY

CROSS-REFERENCE TO RELATED APPLICATION

This patent application claims benefit to U.S. Provisional Patent Application No. 63/623,568, filed Jan. 22, 2024 and U.S. Provisional Patent Application No. 63/561,073, filed Mar. 4, 2024, which are hereby incorporated by reference in their entirety as part of the present disclosure.

FIELD OF THE INVENTION

The present invention relates generally to hydraulic gas compression, and more specifically to a hydraulic gas compressor that allows an increased mass of gas to be compressed for a given flow of liquid and a method of the same.

BACKGROUND OF THE INVENTION

There is a significant difference in the demand for electric power between peak and non-peak hours, as well as throughout the seasons. There can also be large and rapid changes in supply and demand of electric power due to predicted and unpredicted events. While there is somewhat limited capacity and ramp rate from base-load plants and given that wind and solar generation are variable and unpredictable, there is a significant need to "time-shift" electric power. Time shifting is synonymous with energy storage and dispatching the excess electric power stored when demand strains generation capacity. For discharge capacity greater than 4 hours, it is referred to as long duration energy storage (LDES).

The energy provided by fossil fuel and nuclear are considered "dispatchable assets" that can be commanded to generate, adjusted and ramped up or down, as needed, within their specified capacities. As more renewable energy is added to the electric grid, these dispatchable systems are utilized less, causing their fixed cost to be spread over fewer hours, and thereby increasing the cost of electricity. Electric grid reliability requires that sufficient dispatchable power is always available to meet the full demand. Therefore, during times of high renewable energy generation, energy has to be curtailed to permit sufficient dispatchable assets to remain on the electric grid to meet the demand. Curtailing renewable energy is highly inefficient, but is often selected because it's less costly than storing it; it's the lowest cost option. To reduce the amount of energy curtailed as renewable energy increases its grid penetration, more lower cost energy storage solutions are necessary, and in particular, LDES solutions with a low marginal cost of storage.

Hydro Storage, and Pumped Hydro, collectively referred to as Hydro, are the most common LDES solutions. Hydro storage relates to power generation from large reservoirs that contain natural liquid sources behind large dams. Pumped hydro relates to power generation from elevated reservoirs that contain liquid that is pumped from a lower liquid source. Both methods use water in an elevated reservoir to store energy, and when power is needed, allow water to flow (via gravity) through a turbine generator to a lower reservoir. The electric energy for any Hydro storage is determined by the potential energy available, which is determined by the "effective height" (head) and the mass of the elevated body of water. Gravity has low energy density and therefore any Hydro system requires a large mass of water at a significant height to provide meaningful LDES capacity. With many of the best locations already taken, it is generally recognized that the potential for new build Hydro facilities is limited.

Compressed air energy storage (CAES) offers an alternative LDES solution. Energy from CAES for a given stored mass of air is determined by the total temperature drop across the expansion train. Higher temperatures and larger expansion ratios yield higher energy densities. Current CAES technologies use multi-stage mechanical compressors with intercoolers to condition the air for storage. These compressors are complex, have many moving parts, relatively costly and inefficient. They become even less efficient as the targeted gas pressure increases to attain the higher-pressure levels to increase storage capacity. LDES is a critical need to help electric power generation better utilize periods of excess power from renewable energy as the transition is made to a lower carbon intensity energy future, which is referred to as the transition to "net zero". It is generally recognized that to achieve this transition, the use of fossil fuels to generate electric power must be reduced by replacing fossil fuels with renewable energy such as wind and solar. However, renewable energy is typically variable in terms of availability and intensity, and so can create large and rapid output fluctuations which can destabilize the electric power grid. The greater the penetration of renewable energy, the more destabilized the electric power grid becomes. In early simulations, penetrations of around 25% to 30% of total electric power grid capacity was the limit. Any greater % and the electric power grid reliability was impacted, and the additional renewable energy increased the cost of electricity. To maintain balance in an electric power grid with high penetrations of renewable energy, capacity has to be rapidly added or removed. Currently, this balance is maintained by a complex mixture of firm generation comprising Hydro, co-generation plants, chemical batteries, peaker plants, and the curtailment of renewable energy. The use of fast responding peaker plants, that can ramp fast, play an increasingly important part in balancing generation and load on the electric power grid. Chemical batteries (e.g., Li-ion) make up the highest share of new energy storage deployed. However, they satisfy only a very small portion of the stored energy capacity and, the incumbent Hydro plants provide the greatest capacity. With the limited availability of new hydro, to accomplish the transition to net zero, new LDES is necessary. To overcome the issues of capacity, fossil power plants often sit idle or at reduced power to satisfy peak demands, and are continually ramped up and down to maintain electric power grid balance. Renewal energy output is curtailed when the base load fleet cannot be reduced and still provide the necessary grid reliability to cover any shortfall in renewal energy output.

Capacity (or MWh of electricity) is the primary metric used to measure LDES value. For Hydro and CAES, the amount of energy stored for a given system is dependent on the potential energy in the storage reservoirs. Since the metric for comparing LDES alternatives is, MWh/m$^3$, it can be shown that Hydro and CAES have equal capacities for equal pressure heads when there is a temperature drop across the gas expander of approximately 83° C. The capacity of the CAES system can be increased by raising the total temperature drop across the expander, but for Hydro, its output is fixed by gravity. It is therefore not difficult to achieve significant capacity increases at reasonable temperatures when multi-stage expansion systems are used and augmented by thermal sources.

Since most of the capital cost associated with constructing either a Hydro or a CAES system is in the reservoir formation, for otherwise equal cost reservoirs, one advantage of the CAES LDES system over Hydro is that it will have a lower cost per MWh and will also extend the duration of discharge. It should be noted that for certain stored volumes of liquid or gas where the reservoirs are in direct communication with one another, flow will always be to a point where the bodies of liquid or gas are in equilibrium. That is, the system is at a status quo and forces on the reservoirs are equal and opposite. Another favorable advantage of CAES over Hydro is that thermal from renewable energy sources can be directly used by CAES, thus overcoming the conversion from electric to chemical and back to electric. Those conversions can lose 20% of the original capacity. Using mature solar thermal technologies, CAES can convert thermal energy to electric at high efficiency, and only a small fraction time shifted and parasitic to grid output. While today efficiency is not critical due to the low cost of off-peak electric, in the future, as more storage capacity is added, and less electric power is available, LDES efficiency will likely become critical.

SUMMARY OF THE INVENTION

The present invention is directed to a hydraulic gas compressor that can increase the mass of gas to be compressed for a given flow of liquid and a method of the same. This is achieved by pre-compressing the gas in an inlet system before mixing it with the liquid, thereby permitting an increased mass of gas per unit volume of liquid to be compressed by a hydraulic compressor. The compressed gas can be collected and stored, which can then be used to drive an expander to produce work. During the conversion to work, electric heaters, thermal energy from renewable sources, waste heat, or thermal energy storage can be employed in combination to provide thermal energy to the process. The temperature of heat addition is closely matched to the available expansion to increase the energy utilization. Collocating the hydraulic compressor with a hydro-power system can be used to increase overall capacity and reduce or avoid water consumption. The low marginal cost of the supplemental energy storage makes CAES ideal for long duration energy storage (LDES). The contained inlet system permits the mixing and hydraulic compression of any compatible gas and liquid.

This hydraulic compressor can be in the form of a closed loop system or semi-closed loop system that can accept a gas at any pressure, or compress the gas before it enters the hydraulic compressor. Controlling the flow of both the gas and the liquid permits the desired gas flow without mechanical adjustments. The compressed gas can be stored or released during the process of compression. If stored, it can be applied to LDES by releasing through an expander. The expander can be optimized for the pressure and heat sources available. By matching the expander to the thermal energy source, the conversion of heat energy to useful work can be achieved at very high efficiencies.

The hydraulic compression process starts with entraining gas into a falling column of liquid. The pressure within the liquid column is created by both the pressure acting on the surface of the liquid and the weight of the liquid above it in the column of liquid. The pressure of the entrained gas and the liquid increases as it travels down the column. The compressed gas is then separated from the liquid at the base of the column, where it rises due to buoyancy, and is collected in a gas pocket that is formed above the level of liquid. After releasing the gas, the substantially "gas-free" liquid is returned to the surface through a riser, where it is available to repeat the cycle. The pressure in the stored gas is dictated by the pressure at the base of the riser, and is due to the head of water and pressure acting on the upper reservoir.

Entraining gas into the liquid is conventionally achieved through vortex induced flow in a tube positioned below the surface of liquid. The liquid forms a free vortex above the entry to the mixing tube or tubes and draws in gas due to the suction formed in the center of the vortex. Gas mixes with the liquid at the center of the vortex along its wetted surface. The height of the liquid above the tube, together with the tube diameter, determine the rate of liquid flow within the tube. The gas forms bubbles within the liquid and the mixture of gas and liquid exits the tube into a shaft. The composition and flow of the mixture depends on the ratio of gas to liquid and the size and shape of the bubbles. This two-phase flow regime is referred to as "bubbly flow". If too much gas is mixed with the liquid, the bubbles become large and the flow becomes unstable. Studies have shown that small bubbles, occupying around 50% of the volume, provides the ideal condition for maximizing the air flow rate in water. Maximizing flow rate also depends on the liquid viscosity and buoyancy forces acting on the gas bubbles. It can be appreciated that by increasing the density of the gas introduced, a greater mass flow of gas can be achieved for a given flow rate of liquid.

Mechanical devices are typically used to control the submerged tube depth in the liquid. In the new hydraulic compressor, the tube depth is more simply controlled, and with greater fidelity, by the liquid feed rate. Managing the inlet pressure of gas and the liquid flow rate allows optimization of the liquid level above the tubes for a commanded gas flow rate. During times where faster charging is required, efficiency can be traded with capacity, and more energy consumed to compress the inlet gas to increase its mass flow. When slower charging is permitted, the pressure of inlet gas can be reduced for optimal efficiency to achieve the desired rate of compressed gas storage.

The power consumed by the pump to return the liquid to the upper reservoir is a function of the head differential required to achieve the liquid flow rate and is affected by the pressure of the gas in the inlet, the pump efficiency and the losses within the system. One favorable aspect of recirculating the same liquid in a closed loop hydraulic compressor is that it becomes fully saturated with the gas and will store all of the gas admitted at the inlet. This increases the efficiency, yielding a greater delivery rate of compressed gas.

Hydraulic compression of gas is near isentropic (having equal entropy). That is, almost no heat (energy) is lost from the system. As the gas bubbles compress, the surrounding liquid conducts away the heat such that the gas and the surrounding liquid are substantially at an equilibrium temperature. The liquid, having a product of mass and specific heat that are orders of magnitude greater than the gas, conduct the heat away efficiently with only an insignificant rise in temperature. The total temperature of the mixture after the gas is fully compressed can be calculated by the ideal temperature rise of the gas and the proportion of gas to liquid mass, plus the work added due to friction losses in the flow stream. For closed systems, however, where the liquid is recirculated, the temperature may increase measurably over time. In fact, the liquid may become sufficiently warm to warrant the use of a heat exchanger to cool it by removing the accumulated heat. This could be accomplished by either rejecting the heat to atmosphere, or capturing the accumulated heat. If captured, it may be feasible to use a heat pump to drive it into a TES for later use. The heat of compression can be managed by either rejecting from the system, or using a heat exchange system to capture and store it.

To increase the efficiency of the process, friction losses must be minimized. These losses are typically a function of: 1) liquid velocity; 2) hydraulic diameter of flow passage(s); 3) the turbulence in the flow; and, 4) the frictional coefficients of the wetted surfaces. The last two parameters are represented in non-dimensional form by the Reynolds Number (Re) and the flow regime. It is critical to determine these two parameters in order to determine the loss. Flow begins as laminar until it reaches an unstable transition period as it approaches a Re=5,000. Above Re=5,000, flow is considered to be turbulent. Since turbulence consumes energy with no benefit, steps must be taken to keep flow as close to laminar (that is, well below Re=5,000) as is practical and economically feasible.

During the downwards flow under gravity, the gas is being compressed; that is, reducing its volume is being reduced. Thus, all other things remaining constant, the total volume of the flow is also being reduced. Since the liquid is considered incompressible, in a pipe of constant diameter, the mixture flow velocity will decrease as the gas is compressed (mass flow=r.V.A.). This favorable combination of factors reduces the losses. Note that liquid density increases because gas density increases. However, because the gas was already in the liquid, at a specific volumetric ratio, the overall mass ratio doesn't change. Further, because the liquid is presumed to completely fill the constant diameter pipe, in a loop, by the thermodynamic law of conservation, it must slow down to preserve the mass flow across top and bottom planes.

Bubbly flow has been well documented, both for hydraulic compressors and for lift pumps (which use the added gas to increase buoyancy). It has been shown, however, that above some specific volumetric gas-to-liquid ratio, the flow becomes unstable, thus limiting the volumetric flow ratio of gas to liquid in any system. Above this volumetric ratio, hydraulic compression becomes ineffective. To increase the gas mass flow rate, in one proposed application, pressurized gas is injected into an inlet system allowing an increase in gas mass flow rate. Since the rate of volume reduction decreases with increased pressure ratio, the largest gas volume reductions per unit energy to compress, are achieved at lower pressure ratios. For example, at a pressure ratio of 2:1, there is a 50% reduction in gas volume. Doubling the pressure ratio to 4:1, only achieves a further 25% reduction relative to the initial gas volume.

By controlling the pressure at the inlet to the hydraulic compressor, it is possible to use gas at any pressure: at ambient, above ambient, or even below ambient. However, the mass ratio of gas to liquid is improved when the inlet gas pressure is increased. The pressurized gas can be injected directly or indirectly.

A preferred application of pressurizing the gas delivered to the inlet is to also pressurize the upper reservoir, thereby reducing the pressure differential that the liquid pump must overcome to deliver liquid to the inlet system. Increasing the head pressure in the upper reservoir also increases the pressure of stored gas and can suppress the pressure variation attributed to charge and discharge cycles. The pressurization will also mitigate the tendency for creep in reservoirs that are subject to external geological pressure, as encountered in underground salt domes commonly used for compressed gas storage.

When using compressed gas, there are two main options for mixing: direct and indirect. Indirect utilizes a gas pocket sitting above the liquid level in the inlet system, similar to the atmospheric hydraulic compression system. Direct mixing directly injects the compressed gas into the liquid, which allows for novel geometries that enhances the injection and mixing of the gas in the liquid. Unlike the indirect method, the directly injected gas can be at a pressure substantially higher than the liquid.

While Hydro solutions are the current benchmark for LDES, they have a low energy density compared to CAES systems. Hydro systems employ the energy of water flowing through turbines under gravity to produce work and require large volumes of water. Their efficiency, capacity, and water conservation can be improved by integrating CAES. By integrating the hydraulic compressor with a Hydro system, the stored gas pressure is isobaric and maintained at the pressure from the available head of water. By employing an expander and a heat source, the energy generated per unit volume from the stored gas can be many times that from water. In a PH system, the energy of the water is lost as it replaces the air consumed in the process. In the hydraulic compressor the water used to maintain gas storage pressure is in communication and is contained in the reservoir and so the hydraulic compressor capacity is unaffected. When the water level is low, the head height can actually be increased through the storage of compressed air. The benefit from CAES is dependent on the physical attributes and location of the air storage vessel, and the floor contour if the reservoir adjacent to the dam.

For PH, water in high reservoir is used at the inlet system. The compressed air reservoir is located at the lower elevation and acted upon by the head of water in the upper reservoir through a connecting pipe, called a riser. The air and water mixture flows down through the downcomer and the air is compressed. The entrained and compressed air, which is lighter than water, is liberated from the water and rises due to buoyancy. It is collected in an air reservoir that sits above the water. The air-free water is returned to the high reservoir through a return shaft, called a riser.

The compressed air is stored underground and is connected to the point of use by a compressed air delivery pipe. The delivery pipe has a single or multiple valves to control flow from the air reservoir. Air from the storage reservoir is prevented from entering the riser by ensuring the water level in the lower reservoir doesn't fall below the level of the uppermost part of the entry to the riser. The integration of the CAES system and PH permits operation of either technology. Without available heat, the efficiency of the PH will be greater than from CAES. Not accounting for renewable heat, it is also more electrically efficient and can charge faster. Therefore, the combined PH and CAES plant affords the flexibility to select the mode of operation best suited to the prevailing grid needs and weather conditions.

CAES systems store energy, both in the form of compressed air and heat. Efficient energy generation requires that the potential energy of the compressed gas is increased by heating. The heat reduces the density of the gas and thereby increases its velocity for a given mass flow of gas. The kinetic energy is increased relative to velocity squared. The higher the temperature of gas entering the expander, the greater the velocity and, therefore, the kinetic energy available for conversion to work. As work is extracted by the expander, the gas temperature reduces as heat energy is converted to work. An efficient process is one where the gas exiting the expander is close to ambient temperature, having used all of the available temperature drop in the conversion of heat to work. An efficient expander has a pressure ratio matched to the temperature of the incoming gas temperature. Using multiple stages of moderate inlet temperatures will result in energy densities many times greater than can be achieved with Hydro. This translates into greater dispatch duration, or if required, increased power for the same volumetric flow consumed by the hydro facility. Furthermore, hydraulic compression and an available head of liquid can be integrated with thermal energy storage. That provides additional flexibility for charging and discharge cycles. Thermal energy storage refers to any technology used for storage of heat. A thermal energy storage system essentially captures heat and then releases it when needed. Simply heating liquid in a tank is one way to store heat energy, however, there are far more sophisticated TES technologies available today.

Thermally augmented hydro-compensated stored compressed air can deliver power densities many times greater than Hydro systems that are solely gravity based. A CAES system can be combined or retrofitted to Hydro plants, and thereby increase capacity and afford greater flexibility when planning storage needs.

Current CAES technology relies on fossil fuel to provide the necessary thermal energy and operate at temperatures that sacrifice efficiency. By matching the available thermal energy resources with an appropriate expansion ratio, both high efficiency and power density can be achieved. Integrating CAES with existing Hydro storage installations is a way to expeditiously increase LDES to meet the demands of the energy transition to net zero.

Energy recovery from CAES is based on the expansion of a hot-compressed-gas through an expander, thereby converting the kinetic energy in the gas to mechanical energy. For a CAES system, the energy available is proportional to: 1) the gas density; 2) its specific heat capacity; and, 3) the temperature drop across the expander. That is, energy stored is proportional to $r \cdot C_p \cdot \Delta T$.

The strong influence of the thermal component on energy is obvious. Less obvious is that the magnitude of $\rho$ and $\Delta T$ are a function of the available pressure of the stored gas. Using these relationships, the available energy from CAES and Hydro can be compared for any given head of water. For the range of expected head heights, it can be shown that CAES has equivalent power density to Hydro when the $\Delta T$ across the expander is around 83° C. This $\Delta T$ can be achieved with a pressure ratio of 2.45:1, or a single stage expander using a head height of only 15 m.

Head heights for Hydro are typically above 400 m, and commercial TES systems can operate over 550° C. The combined effect of these two energy multipliers means that for any given volume of storage capacity, the energy stored in a CAES system will materially exceed that of a Hydro system. Even at low expansion ratios, CAES affords a higher energy density when augmented by the temperatures available from TES.

One of the most important aspects of a CAES system is the compression of the gas. Conventional electro-mechanical compressors used in currently available CAES technologies are expensive. They require constant maintenance due to the many moving parts, require multiple stages, and require heat exchangers to remove the heat of compression before storing. Hydraulic compressors offer many advantages over conventional electro-mechanical compressors. Not only are hydraulic compressors more cost-effective and efficient, but they are considerably simpler, have fewer moving parts, and are therefore far more reliable. Hydraulic compression uses only a pump to drive the process, which is facilitated by the weight of the liquid and the head height of the upper reservoir. They also, very efficiently, deliver cool dry compressed gas to the compressed gas storage reservoir, avoiding the need for costly heat exchange equipment positioned between multiple stages to remove the heat of compression. The power consumed is somewhat independent of the head of compression, and is a strong function of the head differential between the upper reservoir and the gas inlet system, which is used to create flow.

Hydraulic compression works by entraining gas into a falling column of liquid. The pressure within the liquid column is created by both the pressure acting on the liquid on top of the column and the weight of the liquid above it in the column. Thus, the pressure of the entrained gas increases as it and the liquid in which it is entrained travels down the column. The compressed gas is then separated at the base of the column, where it is collected in a reservoir. The now "gas-free" liquid is returned to the top reservoir to repeat the cycle. The power consumed by the pump to return the liquid to the top reservoir is a function of the head differential between the two reservoirs, the pump efficiency and the losses within the piping. One favorable aspect of recirculating the same liquid in a hydraulic compressor is that it becomes fully saturated with the gas and at some point, the liquid will cease absorption. This increases its compression efficiency, yielding a greater mass of compressed gas delivered to the reservoir in subsequent cycles.

Using a similar technique for increasing gas flow, it is also possible to use a hydraulic compressor to deliver compressed gas from a pressurized source, whether it be above or below ambient. A preferred application of this injection method would be to use a head pressure in the upper reservoirs to reduce the pressure differential created by the head height of liquid. That is, the fluctuating pressure attributed to charge and discharge cycles is suppressed due to a significant average pressure. This will likewise mitigate the tendency for creep in reservoirs subject to external geological pressure, like the underground salt domes commonly used for compressed gas storage.

In other instances, the same system could be employed to increase LDES capacity by simply raising the pressure that acts on the head of liquid. Essentially, increasing the static pressure acting across the liquid's surface to add to the pressure from the head of liquid.

For systems that stay charged for long periods, the surface area over which the pressure is applied could be quite small. Of course, this would only be useful when on standby, because as soon as gas was released from the lower reservoir, the small area would soon give way to the larger cross section of the upper reservoir. However, such a system offers an effective means to restrict creep.

Hydraulic compression normally involves open loop systems, that utilize the head height differential between an open body of water at the surface and a compressed air reservoir some distance below. However, where an open liquid resource is not available, a closed loop process can be used. A closed loop system continuously re-circulates the liquid used to transport and compress the gas. These systems have the advantage that a more costly liquid can be used, a liquid that can be selected to improve compression, reduce viscous losses, reduce absorption of the gas, and/or better control the thermal aspect of the process. Of course, its potential impact on the environment, the nature of the equipment needed to circulate it and its cost are important factors to be considered in choosing the liquid. In short, weight, viscosity, specific heat, absorption characteristics, can all be selected to suit the system needs at an economical cost, where weight, cost and environmental impact will typically be the key liquid characteristics.

All things considered, an ideal liquid for hydraulic compression would have a high specific weight and a low viscosity, would not react with the gas, and would have a high specific heat. In a closed loop system, however, the loss of gas to the liquid through absorption, would be limited, since once the liquid becomes saturated, it can no longer absorb gas. Nevertheless, water-based liquids offer a good option due to their ubiquity. Solutions or mixtures involving water can be made that increase its weight, specific heat, and lower viscosity. Brine is an example of a water-based liquid with higher density, although its specific heat will be slightly reduced, that is mitigated, by its higher density. Of course, more costly corrosion-resistant equipment and piping would be needed for brine.

If the performance characteristics are favorable, it may be desirable to employ a single reservoir closed loop system. In these applications, increasing the gas charge rate for a given liquid flow rate can be very beneficial, with the reduced system flow areas having a large beneficial impact on cost. Without pressure compensation applied to the reservoir, the gas in the storage reservoir and the compression fluid must be kept separate. This can be achieved by a combined flow restriction with a valve, or a valve that incorporates a flow restriction or guarantees a unidirectional flow. A Tesla valve is a good example of a device with no moving parts that restricts flow in one direction by causing a large resistance to back flow.

The design of the gas separation chamber is a key element of the hydraulic compressor. It determines how efficiently the gas is liberated and the liquid returned to continue the process. The separating chamber can be baffled to increase the residence time for the gas to separate from the liquid. The baffles prevent direct communication of the incoming mixture of gas and the liquid returning to continue the cycle. If direct communication was permitted the pressurized gas could escape through the riser, coming out of solution as the compression head reduces. This would result in a reduction in head pressure and accelerate the loss of air from storage. The separation gallery can involve a mechanism that prevents the migration of high-pressure gas to the upper reservoir. This device can use fluid levels or pressure differences to release the flow. In some instances, the release will be a controlled constant stream, on others it will be intermittent. If intermittent, the control will also detect and actuate the closing of the valve.

There are two main types of reservoirs available today, constant volume and constant pressure. A constant pressure reservoir is the most efficient, maintaining a near constant pressure during a discharge cycle. In constant volume reservoirs, pressure is reduced as stored gas is discharged. For gas at a constant temperature, the density is directly proportional to the product of the pressure and volume. Thus, for a constant volume reservoir, when half of the stored mass of gas has been discharged, the pressure will also be halved, thereby considerably reducing the potential mass available for a required pressure to drive an expander. Constant pressure storage is the best option if permitted by the site location. However, constant pressure reservoirs tend to be more costly. Nevertheless, as variable renewable energy penetration increases LDES capacity will undoubtedly become more valuable.

For isobaric (i.e., constant pressure) compressed gas storage in a closed loop system, the volume of the gas stored displaces an equal volume of liquid from the lower reservoir to the upper reservoir. However, since the liquid is considered incompressible, relative to a gas, there are at least three ways to achieve isobaric storage: 1) an inflatable membrane acted on by a head of liquid; 2) an intermediate volume of compressible material; or, 3) displace liquid to increase its level.

Liquid in the riser (the hydraulic connection between the reservoirs) is sometimes known to contain dissolved gas. Thus, it has the potential to come out of solution as liquid travels to the upper reservoir, disturbing the flow and creating a gas lift effect. This can be mitigated by either pressurizing the upper chamber (in the case of underground contained reservoirs), through other means of agitation, or by a device incorporated into the riser at (or towards) its bottom. Such a device could impart centrifugal force to separate any residual gas. For upper reservoirs open to atmosphere, the exiting liquid will be dispersed to prevent the formation of a concentrated stream.

Examples of open reservoirs are any large bodies of water like lakes, seas and oceans. Such open bodies of water are ideal mediums to support isobaric compressed gas storage. In some locations, undersea caverns suitable for reservoirs already exist. In bodies of water where they don't exist, it may be necessary to store the compressed gas in a single or a plurality of fabricated vessel(s).

Reservoirs in spent underground caverns and underwater salt domes have long been used for fuel storage reservoirs, including strategic fossil fuel reserves. The United States has a large concentration of such reservoirs in the gulf region, both on land and underwater. Underwater salt domes are also plentiful under the North Sea, and some of them extend onto land. Utilizing these existing structures provides the most expedient and low-cost option for storage. The existing platforms located close to these reservoirs offer a convenient and expeditious host for supporting plant associated with a LDES system. Offshore siting, while creating certain inconveniences for construction and maintenance, serve to resolve many of the other issues associated with variable, renewable energy, such as the need for large and relatively expensive land areas, environmental concerns and maintaining sufficient energy density. The seas, oceans and lakes certainly afford a new frontier for development, and the existing structures convenient hosts.

To be useful, offshore LDES facilities must be connected to a power grid by a line capable of delivering the LDES output. With an electrical connection enabling power to flow in both directions, the reservoir could be charged using excess power from the grid and, in such a manner, act in a load leveling capacity. The charging of the reservoir can be from local curtailed energy, dedicated energy, or excess power from the grid. These offshore sites would generally be located to accommodate the variability from offshore wind farms. Employing variable capacity pumps, or a plethora of pumps, the amount of power consumed can be regulated.

Salt domes are created naturally as salt deposits. They are acted upon by geological pressures that forces the salt up through a weaker capping stratum, forming a mushroom-like dome at the point of penetration. Salt, although solid, behaves more like a liquid that flows extremely slowly. This property is beneficial to the reservoir because it introduces a self-healing characteristic. The movement of the salt is dependent on the geological pressure, the shape factor of the reservoir, and the stresses within the salt. This movement is called "creep". Creep is not necessarily detrimental, depending on its rate (displacement over time). Ultimately, creep will reduce the volume of the reservoir. The propensity for creep is a characteristic that is intrinsic and unique to each particular salt dome. Creep may be slow enough that it will not be a problem. However, if the creep rate is excessive, to enable the dome to be used for compressed gas storage, a pressure close to the geological pressure must be maintained to counterbalance the ever-present ground forces. To manage the creep, the dome's creep rate would need to be factored into the schedule for charge/discharge cycles. For those domes that require frequent discharge, the fastest reasonable charge time should be realized to restore pressure and thus reduce the impact of creep.

Caverns in spent salt domes are typically generated by solution mining. That is, salt is dissolved in a liquid solution that is repeatedly replaced as it becomes saturated. As already stated, such spent salt domes have been frequently used for storage of strategic reserves of fossil fuel.

As noted above, the amount of energy delivered from the expansion of stored compressed gas is a function of the change in temperature. This temperature difference for a given pressure ratio is related to the pressure ratio through the temperature ratio by the formula:

$$\left[\frac{t_1}{t_2}\right] = \left[\frac{p1}{p2}\right]^{\left(\frac{\gamma-1}{\gamma}\right)}.$$

Since the temperature ratio is constant for a given pressure ratio, the difference in temperature will increase as the inlet temperature increases. Accordingly, the higher the inlet temperature, the higher the temperature drop (i.e., $\Delta T$) for a given pressure ratio, and the higher the amount of energy delivered by the expansion process.

Raising gas temperature before expansion will increase the amount of energy available from any given volume of stored compressed gas. The higher the temperature of the gas entering the expander, proportionately greater power is delivered. Furthermore, the gas expansion process reduces both the gas pressure and the gas temperature. Accordingly, if the temperature of the gas is ambient when entering the expander, its temperature when exiting will be significantly below ambient. For example, this process is used in cryogenic applications to achieve extremely low temperature energy. Consequently, it is also critically important to raise the temperature of the compressed gas before it enters the expander to avoid any solid phase liquid from damaging the equipment.

By matching the inlet temperature to the pressure ratio, the exhaust temperature can be designed to a predetermined value. This can be a relatively high temperature to feed a heat exchanger or directed to a TES system. The temperature exiting the expander can also be relatively cold. Cold temperatures are also useful for enhancing temperature differences in low temperature applications. They are especially useful in binary liquid systems for improving the condensing phase of the cycle. For example, the reduced temperature may be used is with either an organic Rankine cycle (ORC) or a steam cycle. It can also be stored efficiently in a TES to be later employed for a different process. It is important to note that beneficial use can be made of any temperature difference ($\Delta T$) and that both hot and cold temperature gas can be used with ambient temperature to create work. Any $\Delta T$ can be used simply as a means of thermal control to prevent overheating or (as with magnets for example) to increase a machines output.

Care must be taken to ensure that during gas expansion, the temperature does not impart a solid phase to any of the constituents of the gas which might contribute to erosion or otherwise damage the expander. This is because in general, potentially moisture laden gas on the cold side could drop below freezing during expansion, forming a solid phase that could potentially damage the expander. For CAES, the TES selected will provide sufficient temperature to prevent this from occurring. However, gas compressed by hydraulic compression is very dry, which limits any potential damage.

There are two main types of TES systems: those that employ media for sensible heat storage, and those that store heat in phase change materials (PCM) at a constant temperature. The latter type stores latent heat usually within the solid to liquid phase. Salt hydrates are a common medium used for high temperature thermal applications and are often employed in conjunction with concentrated solar power (CSP) to provide the potential for 24/7 electricity production. There are currently several CSP installations in the world that employ molten salt storage. TES systems that use sensible heat storage provide an output temperature that is heavily dependent on residence time.

Thermal oil is a reliable and long-used TES medium that is sometimes employed for CSP systems (usually in a series of parabolic troughs). The oil can be heated directly in tubes that run through the troughs, increasing in temperature as it flows from one trough to the next. Storage of heat energy in this manner falls into the "sensible heat" category. The technology is well developed and commercially available. The energy absorbed in these systems depends on the combined length of the trough string. Using several strings of troughs in series can substantially deliver the same amount of energy but at a lower temperature. The temperature of the delivered liquid is established by the string length. Using valves within the system to direct flow, or varying the liquid flow rate, facilitates temperature control for varying conditions.

Ceramics and volcanic rock are also employed in some solid TES devices. Ceramics have the ability to reach very high temperatures, are stable and typically offer large surface areas to facilitate heat transfer, since they generally have low thermal conductivity. Volcanic rock has similar abilities but with the distinct advantage that heat transfer velocity is augmented by increased surface area due to its porosity.

A special form of CAES that is site specific, utilizes the available heat from adjacent geothermal energy systems (GES). GES applications offer the potential for 24/7 reliable renewable energy. In fact, their use as "fast-ramp" renewable energy support might offer the best use of GES. Geothermal wells offer a large range of available temperatures and have typically been used with either steam or ORC power conversion equipment, both of which are most suitable for "around the clock" operation. Using a GES is well suited for integration with certain CAES applications, particularly where a geothermal well is adjacent to a site suitable for a storage reservoir, and the thermal intermittent on demand or stored for later use.

An advantage that a GES combined with a CAES system is power production flexibility and a higher conversion efficiency for the heat. If it is viable to produce some GES output 24 hours a day, then the CAES can be used either in addition to the prime GES power or in place of it. When supplemental, the split of thermal flows can be preferentially arranged to best suit the situation. The output from CAES will be greater than from the prime GES power plant. This is because the energy to compress the gas is not required at the time of generation, allowing all of the expander energy to be delivered as useable power, and nearly all of the thermal energy is converted to electricity, (compared to approximately 18% for ORC and 30% for steam). While those developing GES are focused on 24/7 operation as a sole source of power to stabilize the grid, their greatest value for the energy transition is more likely to be as an intermittent fast ramp for a CAES+GES peaker plant. Rather than competing with variable renewable energy for low-cost generation, GES would be best deployed to support their increased grid penetration using GES+CAES.

GES can be either constant or intermittent. The latter requires a (sometimes long) recovery time to deliver the demanded quantity of heat. Considering the duration of the thermal charge time, the CAES gas charging rate should be faster to ensure availability. However, in the case of isobaric storage, some duration of discharge will always be available, depending on when in the charge cycle the discharge command is issued.

Whatever the thermal storage medium, there are only limited means of inputting energy. It can be: 1) free (or low-cost) off-peak electricity from the grid; 2) locally generated renewable energy sources (like solar, wind or thermal); 3) recovered heat from gas compression; 4) recovered waste heat from industrial or other operations; 5) geothermal heat or, any other available local heat source. The "maximum temperature" and the "ratio of thermal energy-to-available compressed gas", will establish the optimal expansion system, the stage count, the stage heating, and/or the necessity of recuperation necessary to achieve the overall "Lowest Cost of Electricity (LCOE)."

Maintaining a constant inlet temperature to one or more stages of the expander will produce the highest overall temperature drop over multiple stages. However, multiple stages will require additions of certain equipment between each stage to facilitate reheating the gas as it passes from one stage to the next. Nevertheless, multiple stage expanders offer the highest power density arrangement even though they demand higher reservoir pressures because the compressed gas pressure is reduced as it passes through each stage. The required reservoir pressure ratio must be raised to the power "n" for n-stages; that is, the pressure ratio is squared for 2-stages, cubed for 3-stages and so on. Therefore, the ideal system would have the lowest stage count that can still deliver the required power output, where the pressure ratio is matched to the available temperature ratio for a given exit temperature. For a multiple stage expander, the ideal gas reservoir pressure is achieved when it is equal to the total pressure drop over all stages of the expander. In such a system, the multistage expander provides the flow control for full power operation and should not require throttling for flow control.

The most efficient CAES systems will exhaust from the final expander stage at near or below ambient temperature. However, with the focus on power output, CAES systems employed to date have relied on current CAES technology. They have not been particularly efficient and usually exhaust at high temperatures. They also require combustion of fossil fuel. The high exhaust temperature is the result of using an excessive expander inlet temperature that increases the power output (temperature drop) for a given pressure ratio. This is also somewhat related to the use of commercially available turbomachinery and the combustion of fossil fuel.

The preferred expander system will be multistage, configured to: 1) match the available thermal source; 2) permit the highest temperature drop across each stage; and, 3) permit use of lower cost materials. When built with careful consideration to possible future advances in TES technologies, the optimal multistage expander system should be capable of being updated for greater capacity when new technology becomes available.

With the high stored gas pressure required by CAES systems, a common concern is that thrust loads will be too high, requiring a thrust management solution that includes thrust bearings and often times use of a balance disc. To reduce these issues a preferred arrangement for multistage expanders might be back-to-back so that the axial forces acting on each stage of the turbomachinery is offset by the corresponding axial forces acting on the adjacent stage. Back-to-back arrangements typically locate the higher-pressure inlet at the center, between turbines with the gas flowing outward. This arrangement is not uncommon. For example, it is typically used in high pressure steam turbines.

Other workable arrangements may be possible. For example, a counterintuitive approach for CAES would be to reverse the typical arrangement by introducing the hot gas at the external inlets and collect into a single stream in the center. The benefit of this counterintuitive arrangement would be the simplification of larger diameter piping, lowering cost, since similar materials are used on entry and exit from the device. To maintain a low-pressure loss in pipes, the velocity of the gas needs to be kept at a small percentage of the Mach number. Due to expansion, the area of the lower-pressure stream will be larger, determined by the pressure ratio and inlet temperature of the stage. For the larger diameter pipe, at moderate pressure ratios and inlet temperatures, it will be the mass of piping, not the materials, that will dominate cost. For systems with pressure ratio matched to available thermal, this will generally be the case. However, for very high temperature systems with large pressure ratios, this will not be the case.

The design rules for expanders are well known, and turbomachinery can be specifically designed to run at a selected speed or over a range of speeds at reasonable efficiency. Employing these relationships, for a small band of reasonable expander pressure ratios, a single design can be produced that covers a large range of applications. Tuning for mass flow can also be achieved by a simple change to inlet area, by changing the inlet throat height. For small changes this is all that is required, but to improve efficiency it may also be accompanied by a shroud trim to reduce flow-path height. An alternative means of changing mass flow is by restricting the throat using inlet nozzles. Using the same turbomachinery greatly reduces the cost of production and, while not necessary for large scale deployment, can be an effective way to reduce costs during development and early production. To utilize the same machine for the whole expansion train, this approach can be extended to the lower pressure stages by flow splitting, by lower inlet temperatures or by modifying throat dimensions.

The stages designed for a common speed have the advantage that they can be on a common shaft with a single alternator. Even though this approach may sacrifice some efficiency, that is more than offset by the potential for the lowest cost due to part count reduction; a strong driver of both cost and reliability. For a given rating of output, it is therefore possible to design a machine that has a single shaft and uses common turbomachinery for the expansion stages. Such a specific-purpose-designed machine can embody all of the preferred attributes of lowest cost, highest reliability, and commonality for a robust aftermarket support and supply chain. At a minimum, it is preferential to have commonality of raw materials for turbomachinery, castings or forgings, large structural parts such as casings, and to employ common frame sizes for tooling and installation commonality.

To overcome material limitations, and/or use lower cost materials, it is sometimes beneficial to apply the high temperature heat to a lower pressure stage and use the exhaust from the lower pressure stage to heat the higher-pressure stage at the reduced temperature. While this reduces the available total temperature drop, and thus power output, it can use higher temperature heaters and significantly reduce the material cost. Depending on the location, any of these factors may afford a heavy weighting factor and influence the system design.

For dispatchable systems that store energy, the key metric is levelized cost of storage (LCOS). It is calculated by the total lifetime cost over the total lifetime power discharged. A peculiarity, perhaps incongruency, when applied to storage is that for an equal lifetime, systems that dispatch for longer periods require a lower LCOS. This makes modular systems, like batteries for example, unsuitable for LDES. They are more valuable for immediacy, frequent cycling for load leveling, and short duration discharge. The more average daily cycles, the greater the utilization which lowers their LCOS. For this reason, LDES is best satisfied by systems that offer the lowest marginal cost of incremental storage.

Natural geological structures, abandoned or end of life mineral mines, coal mines, or other man-made spaces, undersea caverns or preferential strata, existing salt dome reservoirs are all examples of existing potential storage reservoir options. Although "existing" is a significant benefit, its use may not necessarily be cost-free just because it exists. It may be necessary to line or seal them to ensure that they can retain the high-pressure gas. They will all require some work (and therefore some cost) to add and seal the penetrations required to convert them into functioning gas storage reservoirs.

While there are many suitable natural reservoirs available, it will also be necessary to enlarge, configure, or create new reservoirs. In these instances, cost becomes a critical factor in site selection. Clearly, existing salt caverns currently offer some of the lowest cost options for storage. Use of the boring machine for hyperloop development or repurposing failed hyperloop or disused tunnels or structures also offer options for storage, permitting a return on failed or abandoned assets. Such assets, converted at a reasonable cost could be repurposed as an energy storage system. These disused systems are often located in densely populated areas, or sites that frequently see large changes in energy demand, where siting an energy storage device would suffer little distribution line loss when satisfying the local load.

However, drilling and mining techniques are advancing and may soon offer a viable alternative for creating entirely new reservoirs, particularly in highly desirable locations, providing a distributed storage asset at the point of intended use. Such devices, offer many revenue options, including demand charge reduction, time of day power offset, besides energy arbitrage, using low-cost electricity for charging, or charging as part of a load leveling scheme.

In other cases, especially for underwater applications, it may be necessary to construct a new reservoir. Using a substantially fixed volume submerged vessel that is in communication with the surrounding liquid will reduce the stress on the vessel to the head height difference of the vessel itself. This introduces a maximum pressure differential of 101,325 Pa (1 Atmosphere) for every 10.32 m of vessel height. The pressurized gas delivery pipe will see increasing pressure differentials as the gas is delivered towards the surface.

The low-pressure differentials on such submerged vessels provide an opportunity to use low-cost materials for construction or fabrication. The predominant stress on the pressure vessel is the hoop stress which is calculated by the formula $$\sigma_{hoop} = \frac{p \cdot r}{t}$$

where p is pressure difference, r is radius, and t is thickness. Thus, it can be seen that for a ratio of allowable hoop stress to pressure, the ratio r/t is constant. Stated another way, the allowable pressure difference is increased when the pressure vessel radius in reduced at constant thickness. Using this relationship, a manifolded collection of relatively small diameter pipes can be assembled to provide a robust system for underwater gas storage.

One of the main problems with underwater gas storage vessels is caused by buoyancy. The density differential between the displaced liquid and compressed gas results in a buoyancy force that has to be reacted. To address buoyancy, the reservoir vessel has to be either anchored or tethered to the sea floor or to an adjacent structure, or have sufficient weight added to overcome (or partially overcome if supplemented by other restraints) the buoyancy force.

For systems sited in open bodies of water, wave action may be used to provide the pumping action. The buoyancy of liquid and the sinusoidal motion of waves can be used to lift and drop a piston, or to apply pressure to a bladder, to thereby pump a liquid. Removing the electric generation from the wave activation machine, simplifies the design and construction and makes for a highly reliable and reasonable cost device that uses renewable energy. While wave motion can use the wave height differential to create energy from buoyancy, there is also an impulse component from the mass of liquid and velocity that can also be exploited, to produce a force. Using such devices in conjunction with a hydraulic compressor may be preferred where the wave energy is sufficient, the systems are isolated, or there is insufficient demand for removing electricity from the grid.

The use with GES in locations where existing reservoirs and a natural thermal reservoir are in close proximity would be the preferred embodiment of the envisioned CAES system. While ORC systems or steam turbines are often employed to convert the stored heat to electricity, the conversion rate is low, and only 18% to 30% respectively of the heat is converted into electricity in naturally occurring thermal sites, the remaining 70% to 82% is rejected to the atmosphere, to be returned to the working liquid at the start of the cycle. A CAES system can convert all of this otherwise lost heat, and perhaps more, in a well-designed expansion system that delivers an exhaust stream close to or below ambient temperature. For a given reservoir capacity, a CAES system can yield many times more energy than an ORC or a steam turbine. With a free heat source and the disconnection between compression and expansion, CAES systems are well suited for geothermal applications and can add significant value for firming the Grid.

In an embodiment, the present disclosure is related to a hydraulic compression system, comprising a compressor configured to compress gas entering the system, an inlet system arranged in fluid communication with the compressor such that the gas is compressed prior to entering the inlet system; at least one reservoir in fluid communication with the inlet system, downstream of the inlet system, and a pump configured to aid in circulation of liquid about the system. The system can be a closed-loop system with liquid arranged therein. The gas can be air and the liquid can water. The gas in inlet system can be delivered by the compressor. The compressor can be arranged in an open body of water. The system can further comprise a heat source and at least one expander train in fluid communication with the system.

The gas can be admitted to the compressor at any pressure. The gas that is compressed prior to being admitted to the inlet system can collect in a pocket within the inlet system, above liquid in the inlet system. The inlet system can include a mixer head which mixes the liquid with the gas that has been compressed, prior to a mixture of the liquid and the gas being transferred to the at least one reservoir.

The compressed gas in inlet system can be injected directly into the liquid in the inlet system. The gas in inlet system can be delivered directly at a pressure. The gas in the system can be at a pressure higher than ambient. The gas in the system can be at a pressure lower than ambient.

In another embodiment, the present disclosure is related to a hydraulic compression system, comprising a compressor configured to compress gas entering the system, an inlet system arranged in fluid communication with the compressor such that the gas entering the inlet system is the gas that has been compressed, a first reservoir in fluid communication with the inlet system, downstream of the inlet system, a second reservoir in fluid communication with the first inlet system and a pump configured to aid in in circulation of liquid about the system. The gas can air and the liquid can water. The gas that has been compressed by the compressor can reside in the inlet system in a volume above the liquid. The gas that has been compressed by the compressor can injected directly into the liquid in the inlet system. The second reservoir can open to atmosphere.

The gas in the system can at a pressure higher than ambient. The gas in the system can be at a pressure lower than ambient. The gas that has been compressed can admitted at a pressure to the inlet system.

DETAILED DESCRIPTION OF EMBODIMENTS
OF THE PRESENT DISCLOSURE

With reference now to the figures and in particular FIGS. 1-15 embodiments of the present disclosure will be described.

Figure 1:
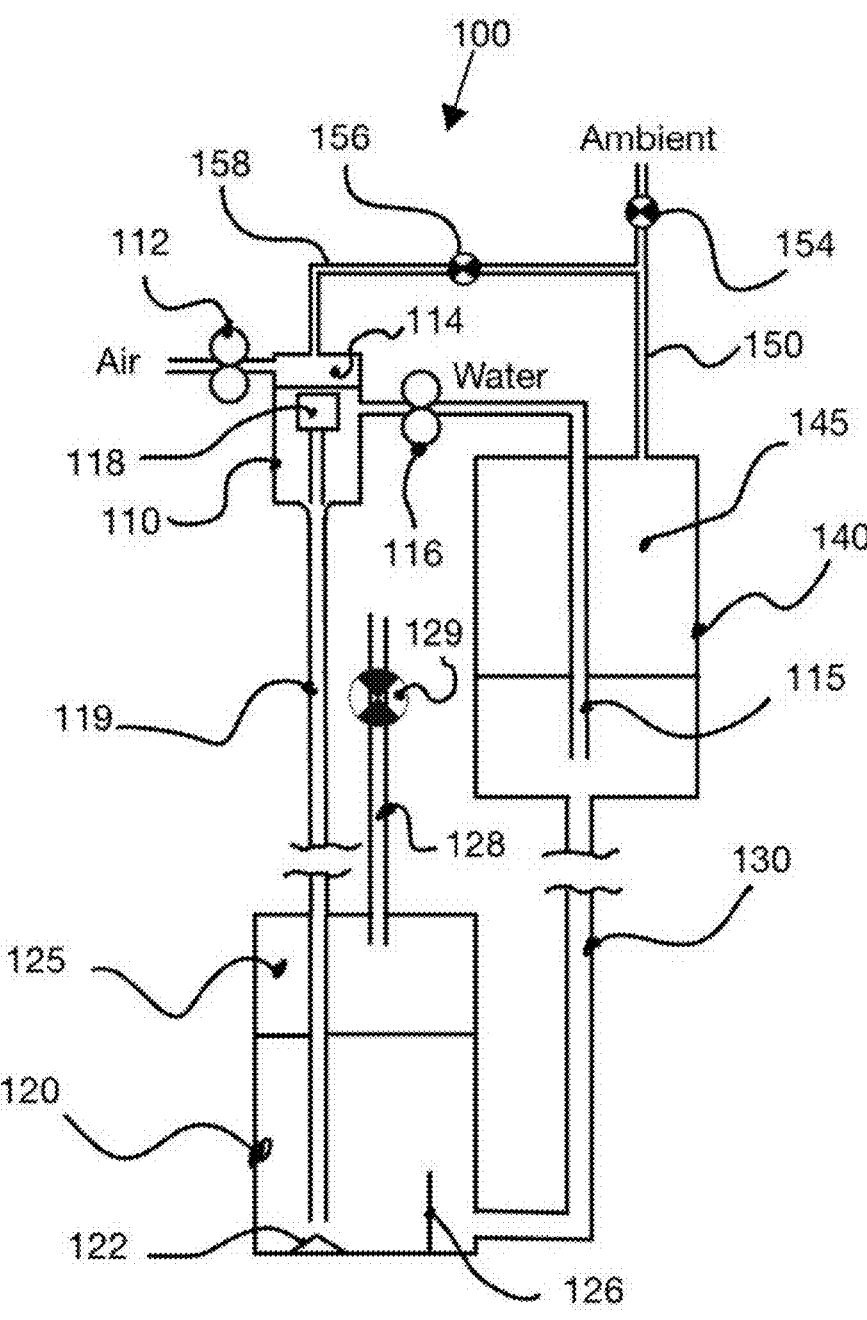
FIG. 1 is a schematic of a hydraulic compression system of an embodiment of the present disclosure having two enclosed reservoirs.

FIG. 1 depicts a schematic of a hydraulic compression system 100. The hydraulic compression system 100 generally includes an inlet system 110 through which air enters, and two water reservoirs, including a first water reservoir 120 and a second water reservoir 140. As can be seen in FIG. 1, the first reservoir 120 is substantially lower than the second reservoir 140. The inlet system 110, the first reservoir 120, and the second reservoir 140 are in fluid communication with each other. Compressed air storage requires a compressor 112 to deliver air into the intake system 110, where it collects in a pocket 114. The pocket 114 is above the water delivered by a pump 116 from the second reservoir 140. The water level in the intake system 110 is maintained at a preferred height above the mixer head 118. To achieve the desired ratio of air to water, water enters the mixer head 118, where the air and water are mixed before entering the shaft 119. As the mixture of air and water descends the shaft 119 towards the first reservoir 120, the air is compressed by the pressure exerted by the surrounding water. The mixture exiting the shaft 119, into the first reservoir 120 is deflected by a plate 122, positioned at the bottom of the first reservoir 120, and directly below the shaft 119. Air, rises out of the water and creates an air pocket 125, which develops at the top of the lower reservoir 120. The pressure of the air contained in the air pocket 125, is established by the head of water and pressure in the second reservoir 140. As air is stored in the first reservoir 120, an equal volume of water is displaced and travels through the shaft 130. The shaft 130 is in fluid communication with the second reservoir 140. The volume of water entering the shaft 130, from the first reservoir 120 results in an equal volume delivered to the second reservoir 140. A shield 126, prevents direct communication of the water entering and leaving the first reservoir 120. Pump 116 draws water from the second reservoir 140, through a fluid connection 115, which is submerged below the level of the water in the second reservoir 140. In a first mode, the air pocket 145, can be maintained at ambient pressure by opening a pipe 150 to atmosphere. It can also operate in a second mode by closing valve 154, and opening valve 156, where the air pocket 145 is connected to the air pocket 114, in the inlet system 110, and be maintained at the pressure of the compressed air delivered to air inlet system 110. By closing valves 154 and 156 the air in pocket 145 can be held at a pressure other than ambient or that in air pocket 114, the hydraulic compressor 100 can operate in a third mode. Stored air 125 is consumed from the lower reservoir 120, by opening valve 129 in the delivery connector 128. The fluid connector 128 provides fluid communication between the air pocket 125, in the first reservoir 120, and the point of use. As air is withdrawn from the first reservoir 120, it is replaced by water from the upper reservoir 140, through the shaft 130. During discharge, the air pressure delivered, is maintained at substantially the same pressure by the second reservoir 140.

The hydraulic compression system 100 increases the mass flow rate per unit volume of liquid by increasing the pressure of the air admitted into the hydraulic compression system 100. By enclosing both reservoirs 120, and 140, the water that enters the system 100 is in a closed loop and continuously circulated. The system 100 can use both ambient and pressurized air and has the ability to control the pressure of the air delivered to the air pocket 114. When the air pocket 145 is in fluid communication with air pocket 114, the pressure in the lower reservoir 125, can be controlled by the pressure acting on the water in the upper reservoir 140. It is noted that for an enclosed water system with air inlets that are not open to atmosphere, any gas or liquid can be used. This allows the gas and the liquid to be selected based on their properties.

Figure 2:
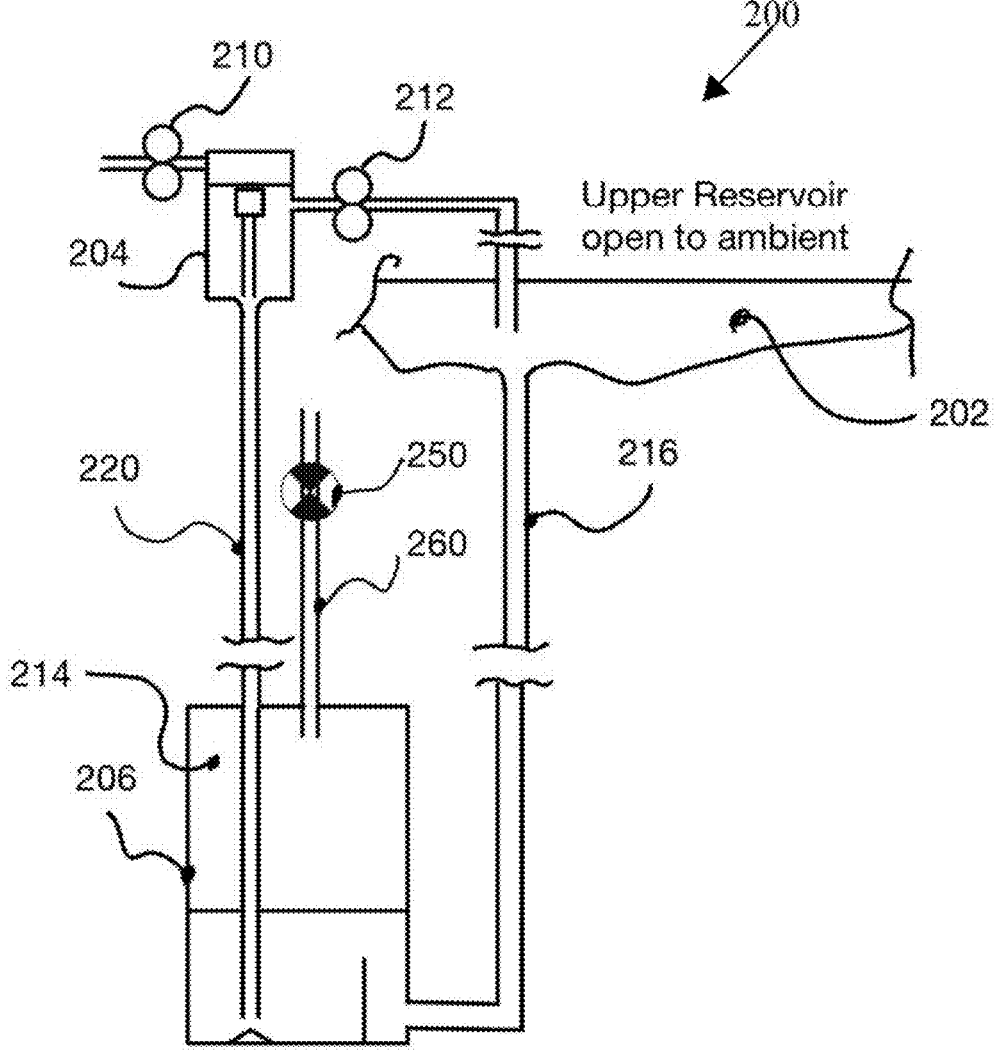
FIG. 2 is a schematic of a hydraulic compression system of an embodiment of the present disclosure incorporating an open body of water.

FIG. 2 illustrates another hydraulic compression system 200, in which the stored gas pressure is established by the head from an open body of water 202. The hydraulic compression system 200 operates the same as the hydraulic compression system 100 as described by its second mode. However, the hydraulic compression system 200 does not allow for pressure head adjustment. The hydraulic compression system 200 comprises an inlet or intake system 204, a first reservoir 206, and a second reservoir 202, that is open to atmosphere. As shown in FIG. 2, the second reservoir 202 is an open body of water which establishes pressure of the stored air. The first reservoir 206 is positioned at a lower elevation than the second reservoir 202. When charging the system 200, a compressor 210 delivers air into the intake system 204, while a pump 212 pumps water into the intake system 204 from the second reservoir 202. The water level in the intake system 204 is maintained at a preferred level, so that the desired ratio of air to water is mixed. The mixture of air and water descends to the first reservoir 206 through a shaft 220. As the mixture of air and water is transported to the first reservoir 206, the air is compressed by the pressure exerted from the surrounding water. The mixture exits the shaft 220 into the first reservoir 206, and the air separates from the water and sits above the water in air pocket 214 in the first reservoir 206. The pressure of the air contained in the air pocket 214, is established by the second reservoir 202, and due to the head of water between the two reservoirs 206, 208. Displaced water travels through the riser 216, to the second reservoir 202. The pump 212 draws water from the second reservoir 202, to replenish the intake system 204 and maintain the desired level of water. A shaft 260 extends from the gas pocket 214 at the top of the lower reservoir 206. A valve 250 in the shaft 260 controls the release of gas from the first reservoir 206. During discharge, water supplied from the second reservoir 202 through the shaft 216, replaces the air in the first reservoir 206, as it is consumed. The hydraulic compression system 200 allows an increased mass of air per volume of water to be delivered to storage.

A blader in the second reservoir 208 could be added to contain water circulating in the hydraulic compression system 200, to retain its closed loop advantage.

Figures 3, 3A:
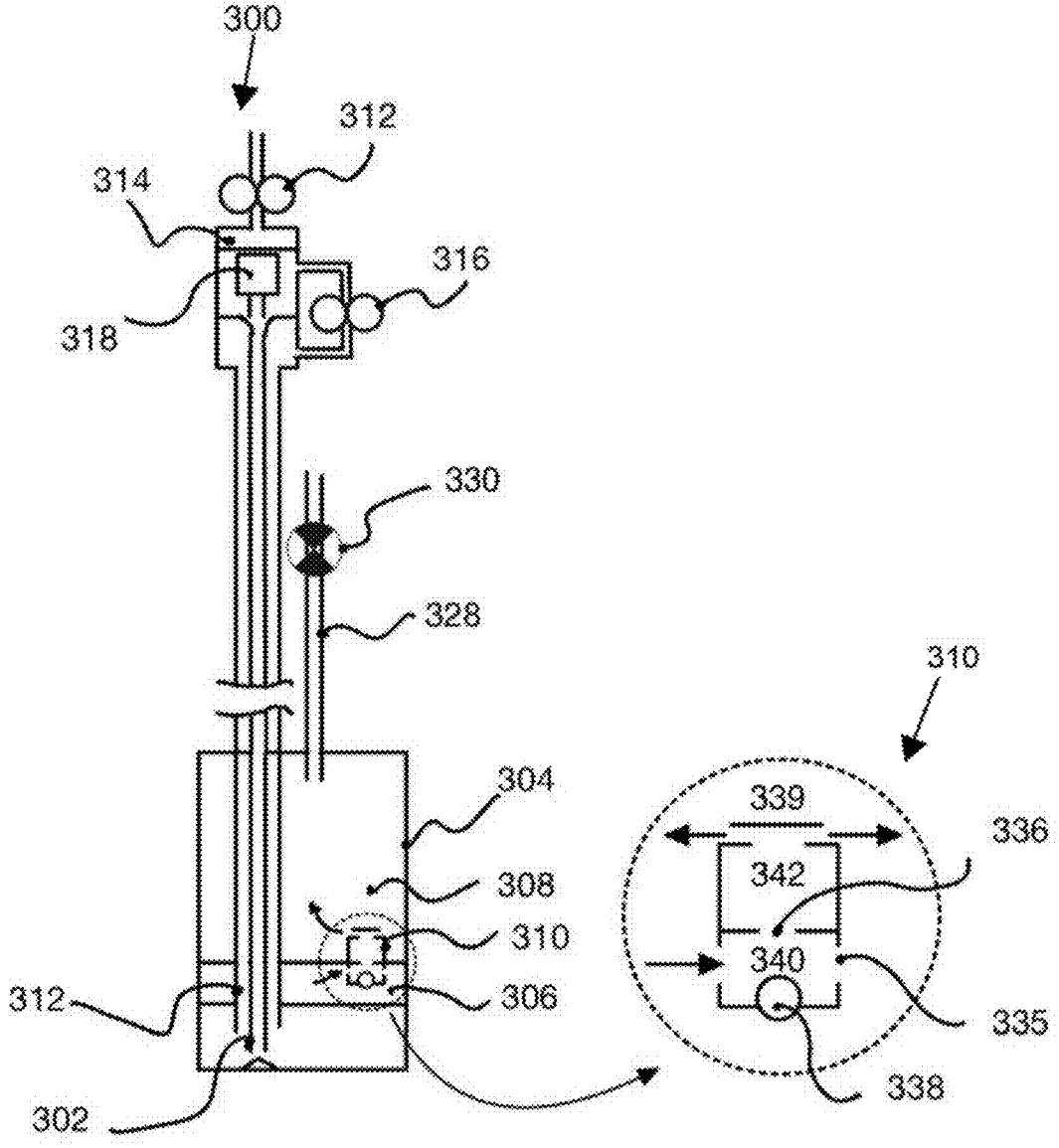
FIG. 3 is a schematic of a hydraulic compression system of an embodiment of the present disclosure incorporating a single reservoir with an annular riser concentric to a downcomer.
FIG. 3A is a detail view of a valve of FIG. 3.

FIG. 3 illustrates a single reservoir closed loop hydraulic compression system 300. The hydraulic compression system 300 is preferred when a two-reservoir system that includes a first or lower reservoir and a second or upper reservoir is not practical, there are water limitations, other liquids and gasses are to be employed, or if the application is for continuous operation or frequent short duration support. The single reservoir system does not have the isobaric storage benefits afforded by the inclusion of an upper reservoir, and as a result, the storage pressure decays as stored air is consumed. The single reservoir system compresses the air in the same way as the systems 100, 200, by mixing compressed air supplied by compressor 312, and water by pump 316, to the air pocket 314, before the air and water mixes in mixer 318, before entering a shaft 302. The gas is further compressed as the mixture descends the shaft 302 to a reservoir 304. The air is separated from the water in a separation chamber 306, where the air forms a pocket above the water before entering the storage chamber 308 through a valve 310. The valve 310 provides two main functions, to transfer higher pressure air from the separation chamber 306 to the compressed air reservoir 308, and to restrict water from entering the air pocket 308 of reservoir 304, for example, when the system 300 is idle and water in the system seeks its lowers. level. Compressed air is released from the mixture of air and water into the separation chamber 306. When the pressure in separation chamber 306 is greater than the pressure in the storage chamber 308, air flows through the valve 310 and into the storage chamber 306. Air flow stops when the pressure in chamber 306 and chamber 308 are equal. The air free water in the separation chamber 306, is returned to the surface through a concentric riser 312 that surrounds the shaft 302. Concentric systems simplify the piping and reduce the surface footprint. When the pressure in the compressed air reservoir 304 is at a maximum, the pressure in the separation chamber 306 is also at a maximum, as established by the height of the water column in riser 312 and any pressure acting on it. When equilibrium is achieved additional air will not enter the system 300, although water can still flow using pump 316. Monitoring the air delivery rate into the compressed air storage chamber 308 will allow the determination of remaining storage capacity. When the compressed air storage chamber 308 is fully charged, the air and water feeds are stopped. A shaft 328 is in fluid communication between the compressed air chamber 308 and the point of use. A valve 330 controls the flow of compressed air delivered through shaft 328.

Here, the hydraulic compression system 300 is a closed loop system that includes a single reservoir 304, where a valve 310 is used to keep the liquid level from rising into the storage chamber 308. The minimal footprint of the system 300 makes it easy for siting when collocating with an existing facility, and the riser 312 being concentric with the downcomer 302 add to its compactness.

The reservoir 304 and the compressed air storage chamber 308 of the system 300 designed for continuous use and can be much smaller than a system designed to store compressed air for LDES. For continuous use systems, the volume of the compressed air storage chamber 308 requires a volume to buffer any pulsations during the charge cycle, and must accommodate the air mass flow rate consumed by the user of the system. If demand charges for power consumption are an issue, it may have capacity to permit sufficient storage to cover demand over that period. The valve 310 represents one approach to allow the free flow of air from the separation chamber 306, into compressed air chamber 308, while preventing water from passing through. Air is free to flow through orifice 335 in the lower chamber 340, and then through orifice 336 where it passes into the upper chamber 342. When the pressure in chamber 342 is greater than the pressure on 308, air passes through valve 339. In this instance a spherical float 338, raised by the water level in separation chamber 306, and if raised sufficiently, will form a seal by engaging orifice 336.

Figure 4:
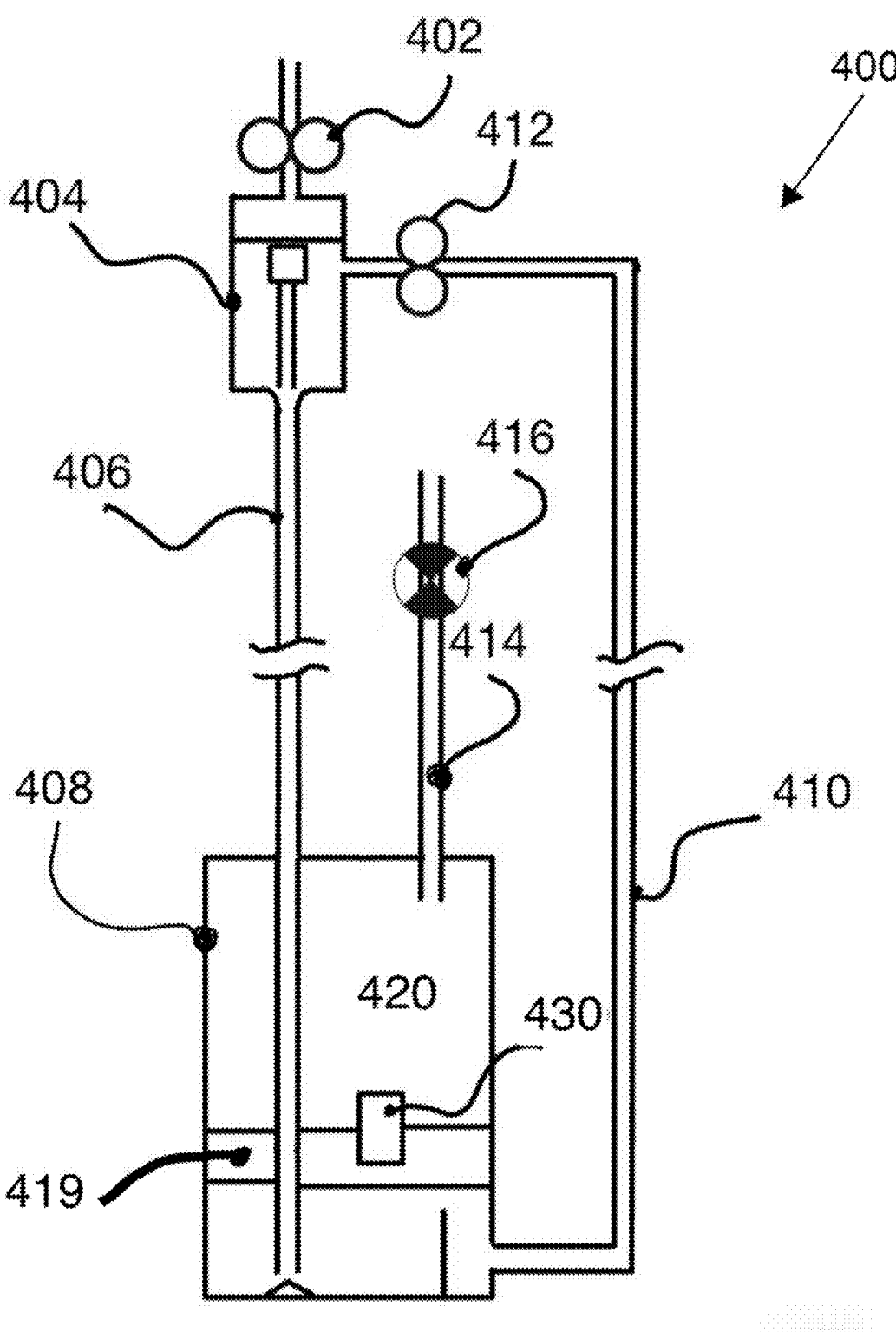
FIG. 4 is a schematic of a hydraulic compression system of an embodiment of the present disclosure incorporating a single reservoir with a discrete riser.

FIG. 4 depicts a non-concentric single reservoir hydraulic compression system 400, that includes a compressor 402 that is configured to deliver air into an intake system 404, a downcomer shaft 406 that extends from the intake system 404 to a reservoir 408, a riser 410 that extends from the reservoir 408 to the intake system 404 with a pump 412 that is configured to pump water from the reservoir 408 to the intake system 404. The reservoir 408 is constructed in two chambers, an upper chamber 420 and a lower chamber 419. the upper chamber 420 is for storing compressed air, the lower chamber 419 is for separating the air from the water. The air rises above the water in the lower chamber 419 and flows to the upper chamber 420 through the valve 430. Stored air can exist the system 400 through a shaft 414 that extends from the upper chamber 420 of reservoir 408 by opening a valve 416 fixed to the shaft 414. As air is withdrawn from the upper chamber 420, the air pressure will be reduced. When the pressure in the lower chamber 419 is higher than the pressure in the upper chamber 420 air will flow from the lower chamber 419 to the upper chamber 420. If the compressed air released from the upper chamber 420 the air in the lower chamber 419, now at a higher pressure, will flow through the valve 430 into the upper chamber 420. When operating in a continuously in. a first mode, the compressed air in the upper chamber 420 is continuously replenished by air from the lower chamber 419 passing through valve 430. When used for storage, a second operating mode, the air in upper chamber 420 will reduce. When the air in the lower chamber 419 is at a higher pressure than the air in the upper chamber 420, air will flow through valve 430. Now that the air is not replenished, the water in the lower chamber will rise. When the water level in the lower chamber 419 rises sufficiently, valve 430 will close the fluid communication between the lower chamber 419, and the upper chamber 420 preventing water from passing through valve 430. The water used to compress the air that flows down the shaft 406 is returned to the intake system 404 through the shaft 410. During discharge, if not continuously replenished, the air pressure in the upper chamber 420 is reduced in proportion to the mass of air released through shaft 414. The intake system 404 can be the same as a two-reservoir system.

Figure 5:
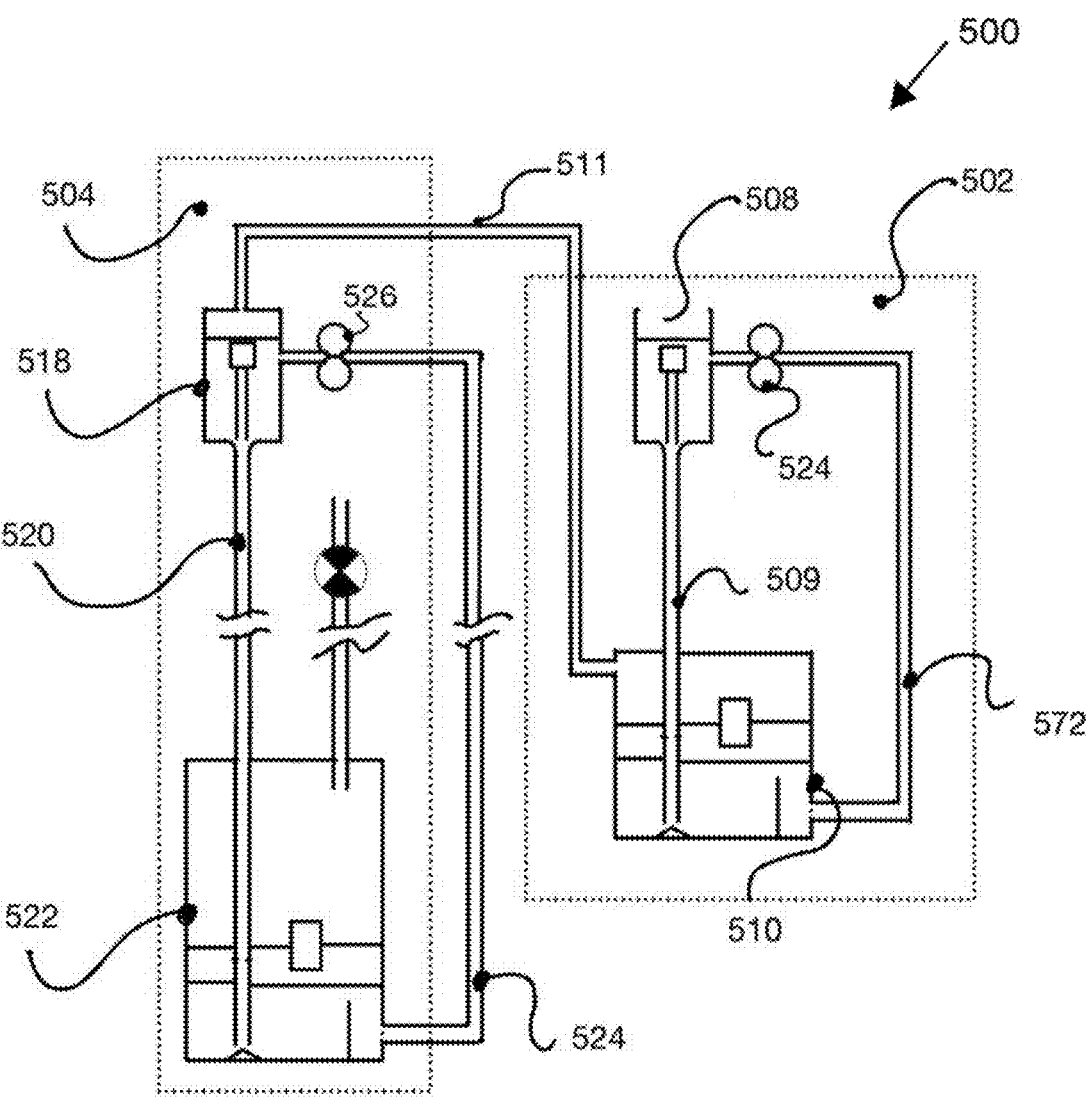
FIG. 5 is a schematic of a hydraulic compression system of an embodiment of the present disclosure which employs a first hydraulic compressor in series with a second hydraulic compressor.

FIG. 5 illustrates a hydraulic compression system 500 that includes two hydraulic compression systems, including a first hydraulic compression system 502 and a second hydraulic compression system 504 that are connected in series. The first hydraulic compression system 502 includes a first inlet system 508, a first downcomer shaft 509 that extends from the first intake system 508 to a first reservoir 510, a first riser 512 extending between the first reservoir 510 and the first intake system 508 with a first pump 524 that is configured to pump water from the first reservoir 510 to the first intake system 508 fixed on the first riser 572. The second hydraulic compression system 504, a second inlet 518 in which air from the first hydraulic compressor 502 is delivered, a second downcomer shaft 520 that extends from the second intake system 518 to a second reservoir 522, a second riser 524 extending between the second reservoir 522 and the second intake system 518 with a second pump 526 that is configured to pump water from the second reservoir 522 to the second intake system 518 fixed on the second riser 524.

The first hydraulic compression system 502 uses ambient air at the first inlet 508 for the initial low-pressure ratio compression and is not pressurized by an air compressor. The first reservoir 510 is connected to the second air inlet 518 of the second hydraulic compression system 504 by a supply line 511. The first hydraulic compression system 502 controls the pressure and rate of air flow. The low feed pressure from the first hydraulic compression system 502 can be finely tuned by virtue of adjusting the head height of water acting on the first reservoir 510. For indirect mixing this requires raising or lowering the mixing head.

Figure 6:
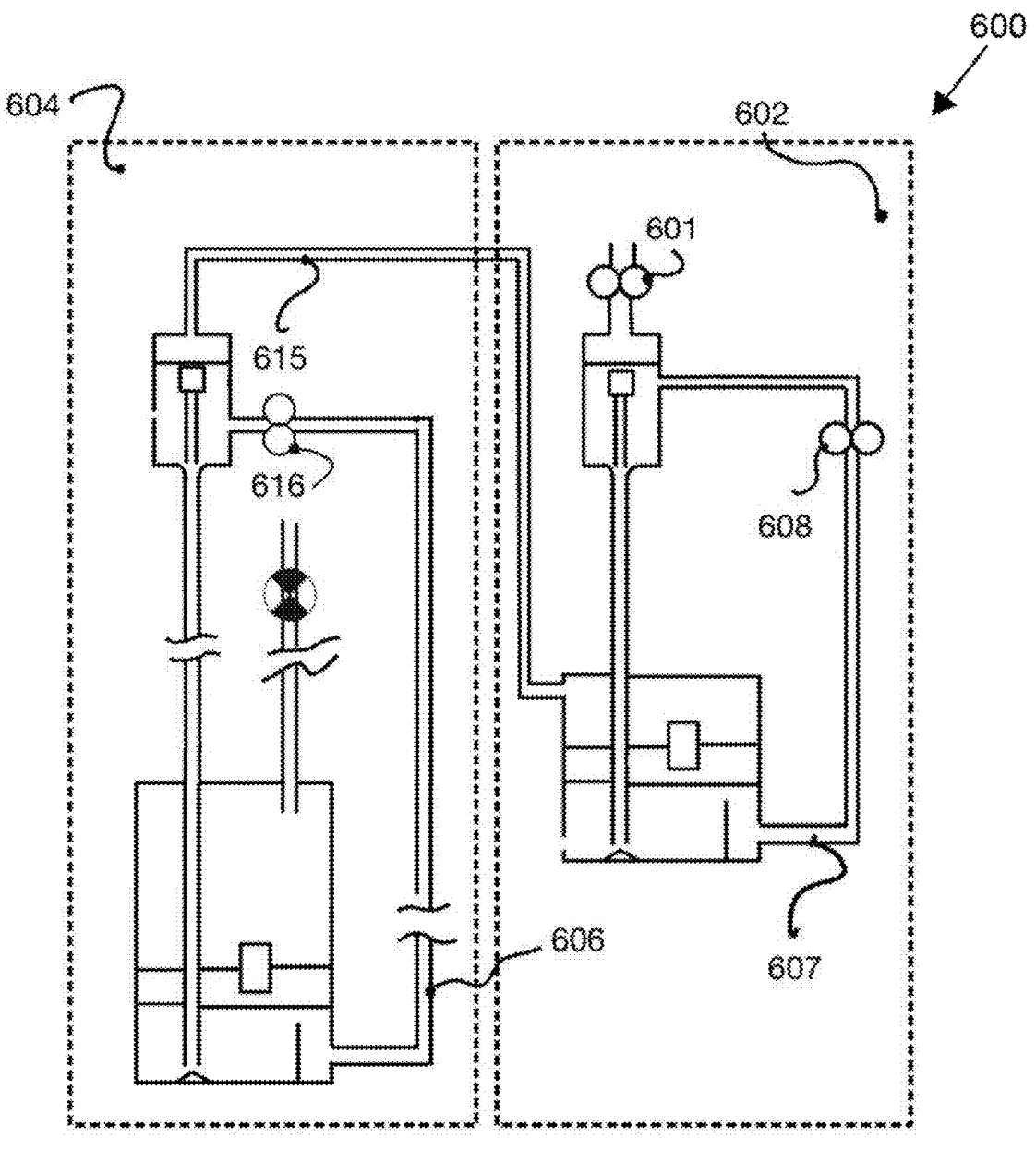
FIG. 6 is a schematic of a hydraulic compression system of an embodiment of the present disclosure which employs a first pressurized hydraulic compressor in series with a second hydraulic compressor.

FIG. 6 illustrates another hydraulic compression system that includes two hydraulic compression systems, a first hydraulic compression system 602 and a second hydraulic compression system 604 that are connected to each other in series by a conduit 615, where the first hydraulic compression system 602 has a compressor 601 to provide the pressurized air to the inlet system This arrangement permits a greater range of delivery pressures to the second hydraulic compression system 604, and can increase air mass flow rate for a given flow of water used to transport and compress the air. The pressure of compressed air delivered by the second hydraulic compression system 604 through conduit 615 is established by the head of water acting on it and the air pressure in the first hydraulic compression system 602 established by compressor 601. The riser 607 of the first hydraulic compression system 602 permits the water to be circulated in the first hydraulic compressor 602 by pump 608. The riser 606 of the second hydraulic compression system 604 permits the water to be circulated in the second hydraulic compressor 604 by pump 616. Since the air entering the intake of the second hydraulic compression system 604 has higher density, it will require less flow of water than the first hydraulic compression system 602. As the air pressure to the first hydraulic compression system 600, increases the flow differential between the two hydraulic compression systems 602 and 604 is reduced. To minimize losses, it should be appreciated that the all flow areas should be sized to suit the range of flows for the application.

Figure 7:
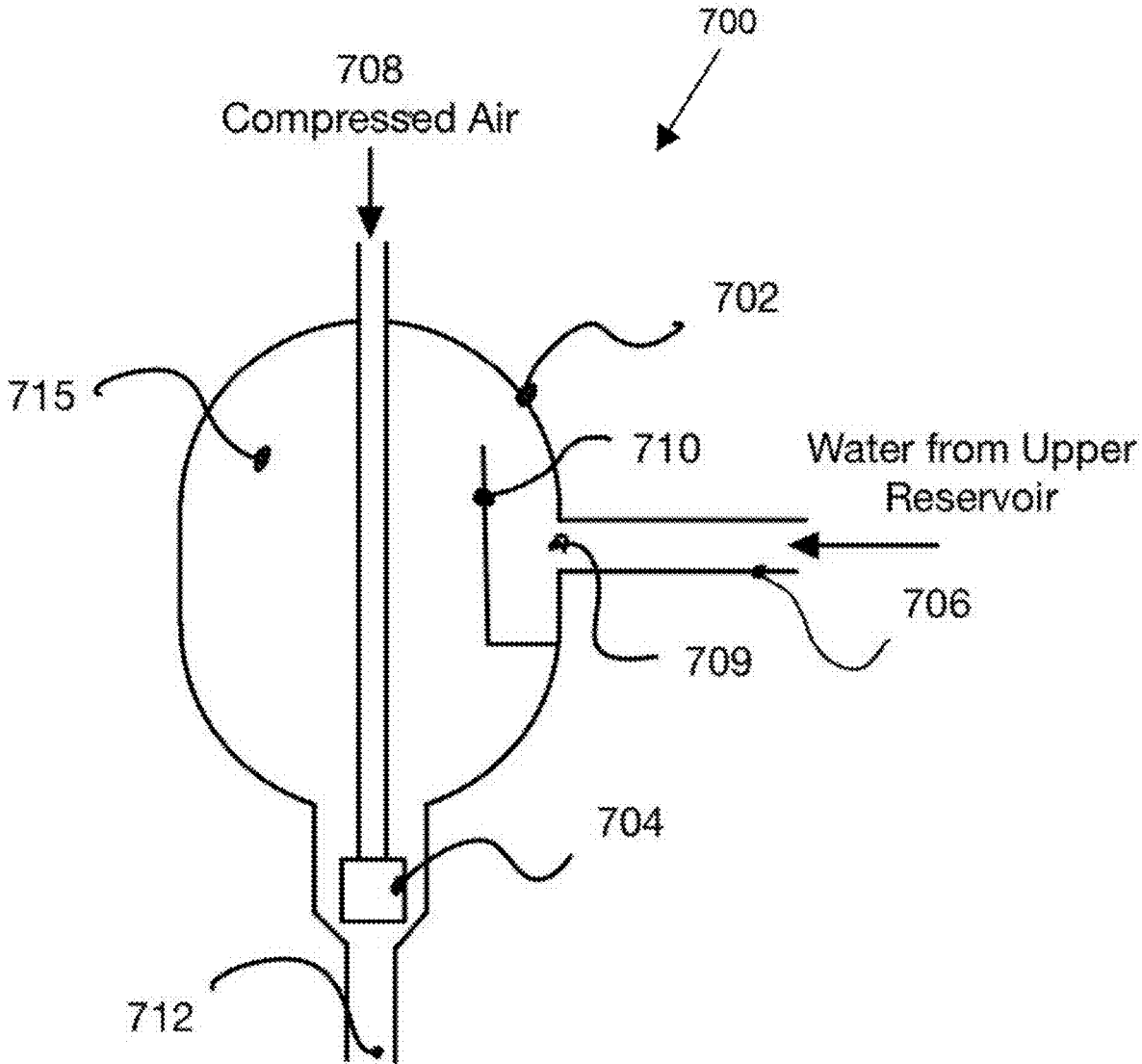
FIG. 7 is a schematic of a pressurized inlet system an element of an embodiment of the present disclosure where gas is directly delivered in to the liquid.

FIG. 7 illustrates a direct air charged pressurized inlet system 700. The inlet system 700 includes an inlet vessel 702, which forms a pressure boundary for a volume 715, a mixing head 704 arranged in the vessel 702, a first shaft 706 through which water enters the vessel 702, a second shaft 708 through which air enters the vessel 702, a baffle 710 arranged in the vessel 702 that is configured to distribute water entering the vessel 702 from the first shaft 706 through orifice 709 without churning, and a shaft 712 extending from the vessel 702.

Here, water enters the vessel 702 delivered from the first shaft 706 from a reservoir (not shown) through an orifice 709 and compressed air enters the vessel 702 by traveling through the second shaft 708 and the mixing head 704. The air and water are mixed in the mixing head 704 before entering the downcomer 712, where the mixture descends to a reservoir (not shown) that is downstream of the inlet system 700. Unlike indirect injection, the pressure of the water and air in the vessel 702 can be substantially different, and are adjusted to control the water and the air flow rates.

Water entering the vessel 702 is prevented from disturbing the flow by a baffle 710. Here, a mixing device 704 uses direct air injection.

Figure 8:
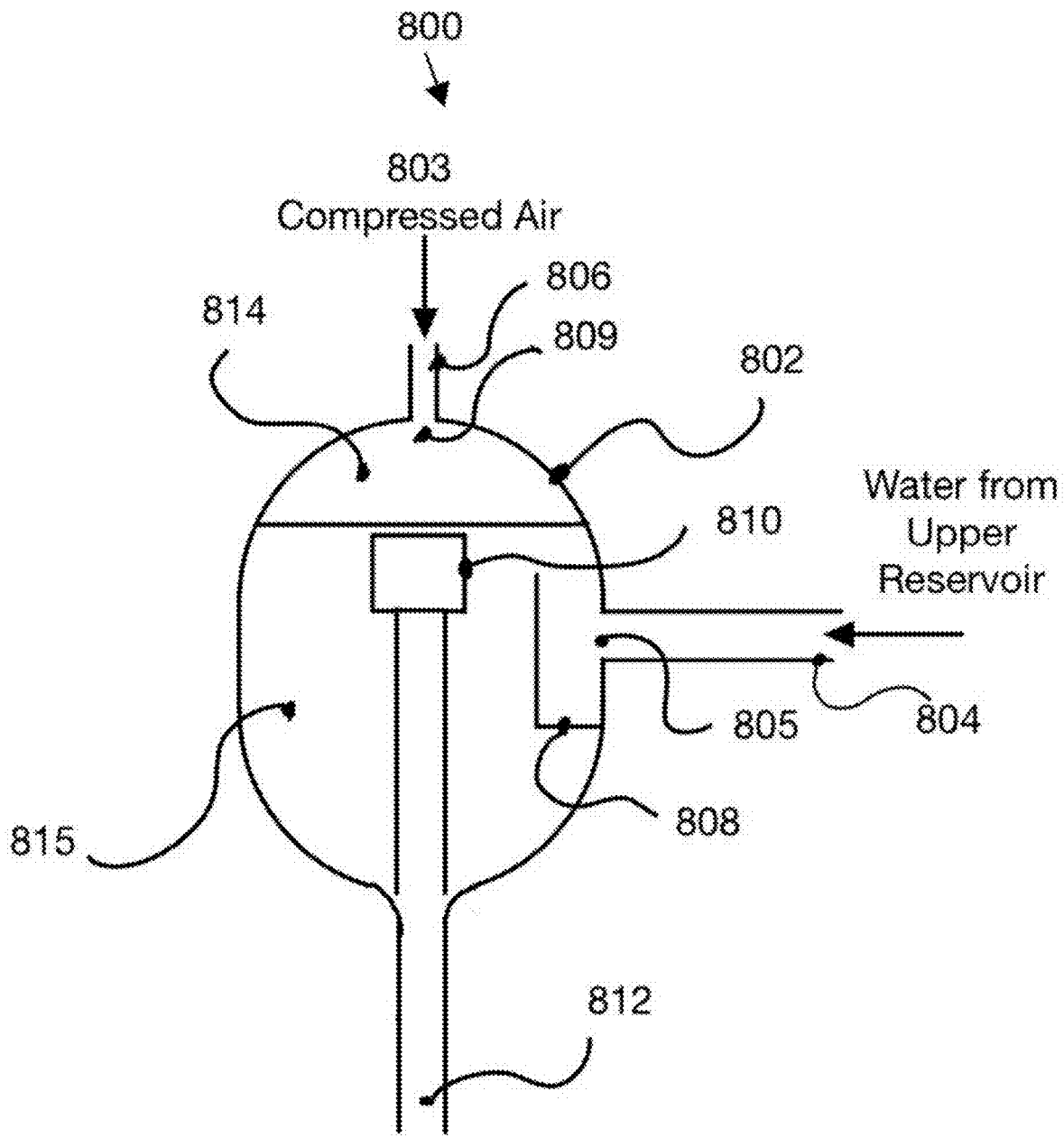
FIG. 8 is a schematic of a pressurized inlet system an element of an embodiment of the present disclosure where gas is indirectly delivered in to the liquid.

FIG. 8 illustrates an indirect air charged pressurized inlet system 800. The indirect air charged pressurized inlet system 800 includes an inlet vessel 802, a first shaft 804 through which water enters the vessel 802, a second shaft 806 through which compressed air enters the vessel 802, a baffle 808 arranged in the vessel 802 that is configured to distribute water entering the vessel 802 from the first shaft 804 without churning, a mixing head 810 arranged in the inlet vessel 802 and a shaft 812 extending from the mixing head 810 and vessel 802. Air enters the inlet vessel 802 from shaft 806 through orifice 809. Water enters the inlet vessel 802 from shaft 804 through orifice 805. Compressed air and water enter the inlet vessel 802, air being less dense occupies the upper volume and forms a pocket 814 in vessel 802 and water occupies the lower volume 815 of vessel 802. The compressed air forms a pocket 814, above the surface of the water. Air and water enter the mixing head 810 where it is mixed before it enters the shaft 812 and where the mixture descends to a reservoir (not shown) that is downstream of the inlet system 800. The flow rate of air is established similar to atmospheric hydraulic air compression systems. However, the depth of the mixing head 810, is now achieved by the level of water in vessel 802 and established by the flow rate of water, and does require mechanical positioning.

Figure 9:
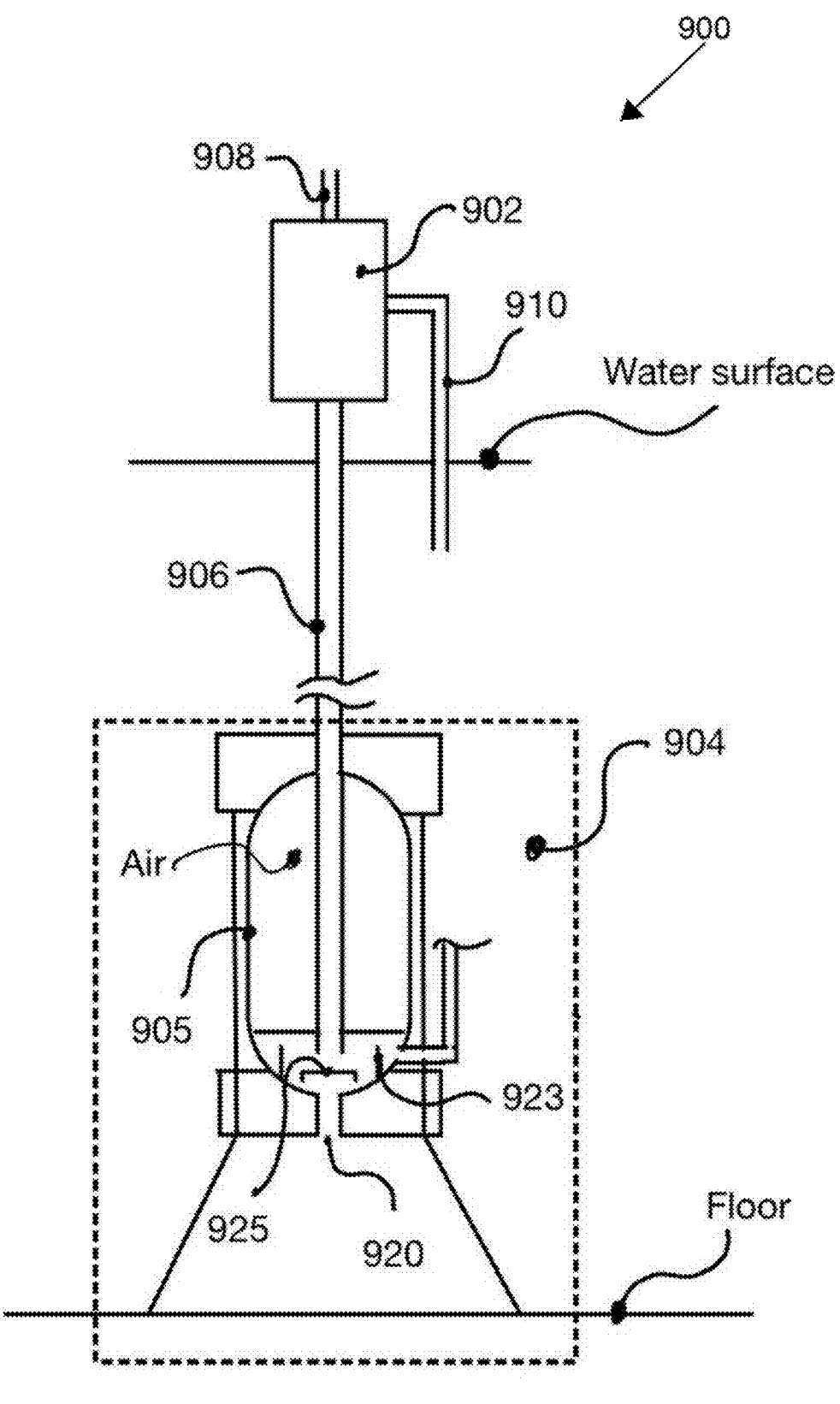
FIG. 9 is a schematic of a hydraulic compression system of an embodiment of the present disclosure that applies to open bodies of water.

FIG. 9 is a schematic of an open water hydraulic air compression system 900 that stores water isochorically (constant pressure). The system resists buoyancy caused by the density difference of the stored and displaced air. The system 900 generally includes an inlet system 902 and a reservoir 904. The inlet system 902 is positioned above the reservoir 904 and is in communication with the reservoir 904 through a shaft 906. Air enters the inlet system 902 through a connection 908, and water enters through a conduit 910. The water and air are mixed before entering the conduit 906 where the mixture is transported to the lower section of vessel 905 of reservoir 904. The air is separated from the water and collected in the vessel 905. Air free water from the vessel 905 is transported to the inlet system 902 through a pipe 910. The air water mixture exits conduit 906 directly above plate 925 that prevents direct communication with orifice 920 that permits fluid communication between the vessel 905 and the surrounding body of water. A plate 923 prevents direct communication between the air water mixture exiting conduit 906 and the conduit 910 which returns the water to the inlet system 902.

Figure 10:
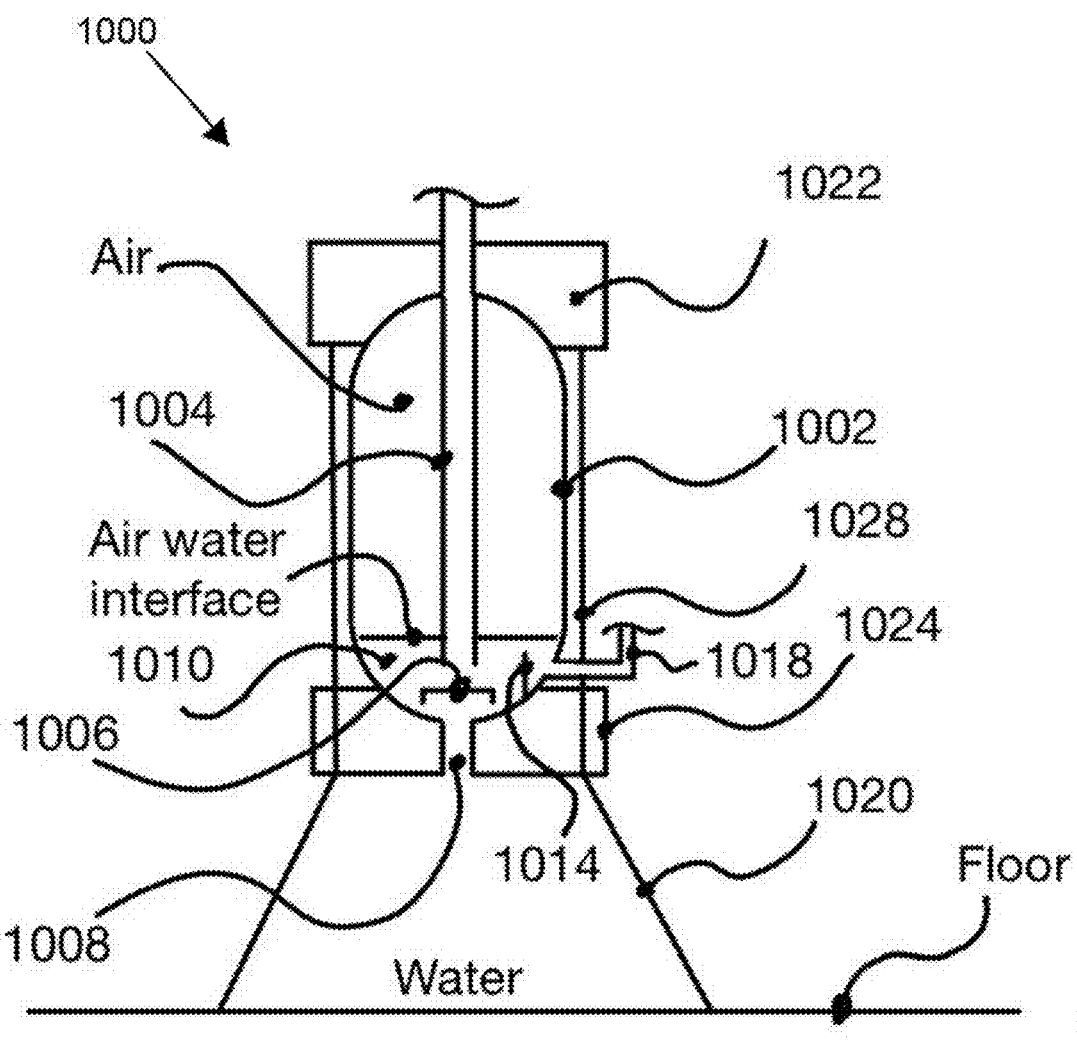
FIG. 10 is a schematic of an underwater storage system of an embodiment of the present disclosure.

FIG. 10 is a schematic of an underwater storage system 1000 that includes a vessel 1002 that provides a boundary between the stored air and surrounding water. he mixture of air and water are delivered to the vessel 1002 by a pipe 1004. The exit of the pipe 1004 is directly over a plate 1006. The plate 1006 prevents direct communication of the mixture exiting the pipe 1004 with the water inlet 1008. Air is separated from the water in a separation gallery 1010. As the air separates from the water, it rises and occupies the upper level of the vessel 1002. As air is collected, water is displaced from the vessel 1002 through an orifice 1008. A plate 1014 is positioned to prevent direct communication of the mixture exiting pipe 1004, and the water return line 1018. The weight of water displaced by the air creates a buoyancy force that is reacted by lines 1020. To reduce the load in lines 1020, a first weight 1022, and a second weight 1024, act on the vessel 1002. The members 1028 prevent compression of the vessel 1002 when there is insufficient buoyancy to counteract the first weight 1022. The system

1000 is designed to resist buoyancy and facilitate the separation of air from water and prevent compressed air from escaping through a riser 1018 or a water inlet 1008. The mass of the first weight 1022 and the second weight 1024 are selected to minimize stresses in the members 1026 that, for rigid vessels must prevent a load being transferred to the vessel 1002.

Figure 11:
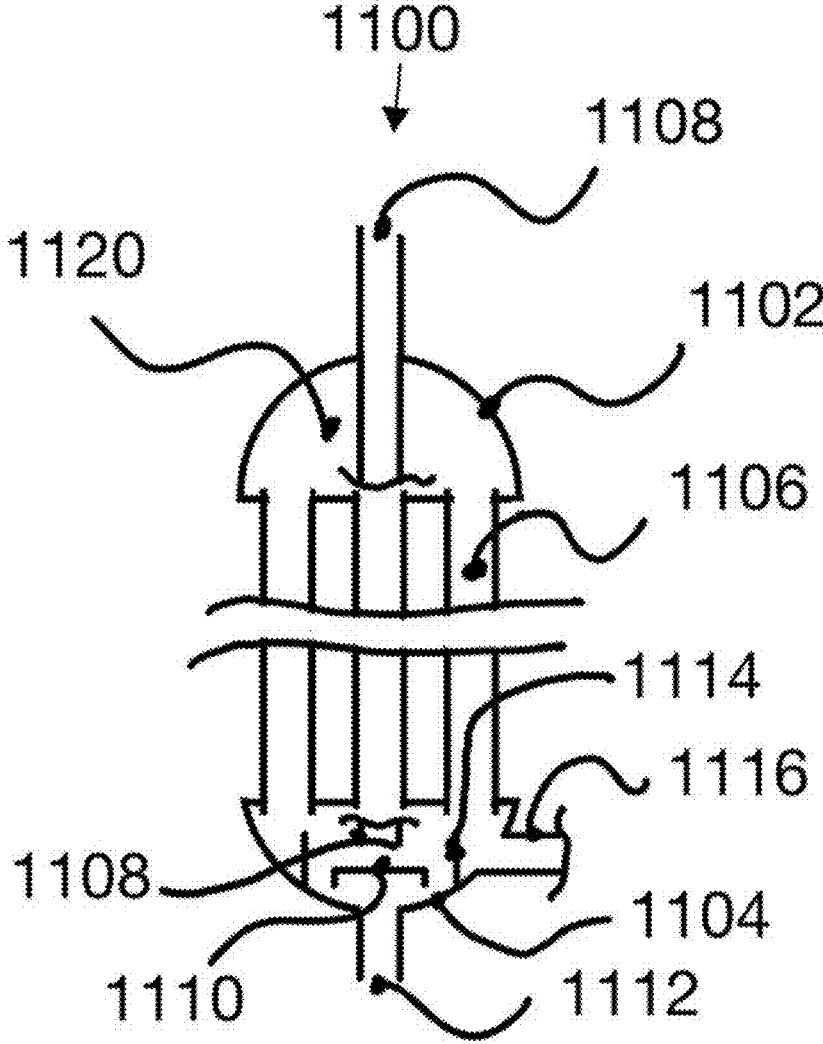
FIG. 11 is a schematic of an underwater storage vessel of an embodiment of the present disclosure.

FIG. 11 illustrates an underwater storage vessel 1100. The storage vessel 1100 generally comprises a first header 1102, a second header 1104, and a plurality of pipes 1106 that connect the first header 1102 and the second header 1104 to each other. A pipe 1108 penetrates the vessel 1100 through the first header 1102, and terminates in the second header 1104 above plate 1110. A plate 1110 prevents direct communication of the discharge of the pipe 1108 with the water outlet 1112. A plate 1114 prevents direct communication of discharge of the pipe 1108 with the water return line 1116. The pipes 1106 constitutes the majority of the volume of the vessel 1100 and offer superior rigidity and can be selected for pressure limits due to head differences. The system 1100 can be installed horizontally to the sea bed to eliminate a pressure differential in the pipe by eliminating the large head acting on the pipe.

Figure 12:
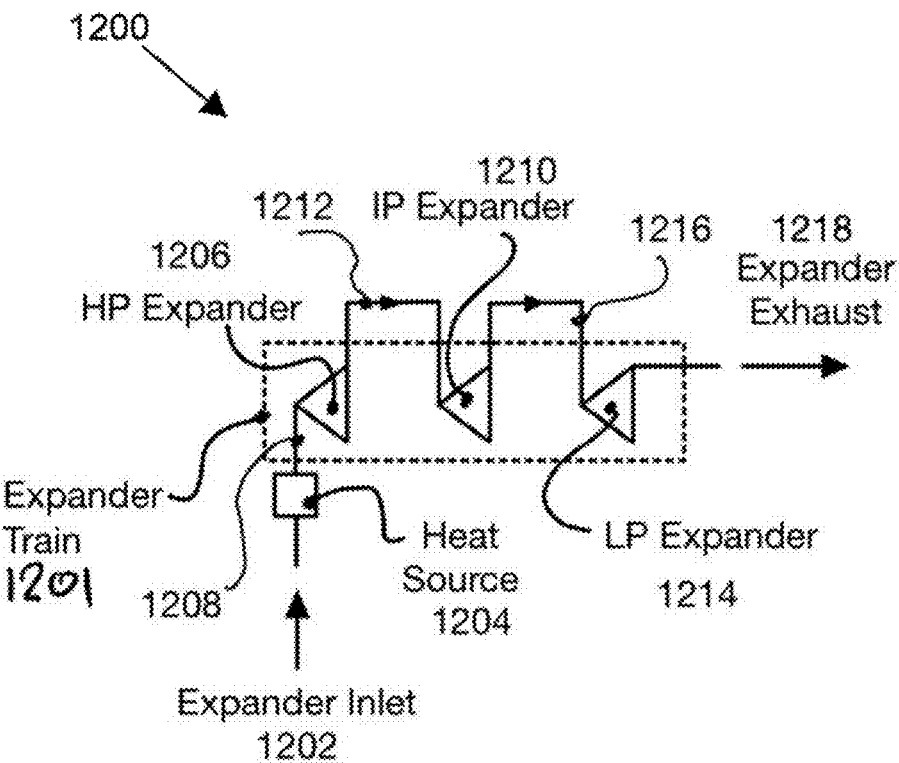
FIG. 12 is a schematic of a multi-stage expander system of an energy conversion cycle of an embodiment of the present disclosure, with single heat input at the inlet to the expander.

FIG. 12 is a schematic of an embodiment of a multi-stage expander system 1200 that includes a single high temperature heat source. The multi-stage expansion system 1200 includes an inlet 1202, a single high temperature heat source 1204 that is connected to a first expander 1206 by a first conduit 1208, a second expander 1210, a second conduit 1212 that extends between the first expander 1206 and the second expander 1210, a third expander 1214 and a third conduit 1216 that extends between the second expander 1210 and the third expander 1214. Gas at a first temperature enters the heat source 1204 through the inlet 1202 and exits the system 1200 at a second temperature, which is substantially the same as the first temperature. Upon existing the heat source 1204, the gas, which is now at the second temperature, and higher than the first temperature, enters the first expander 1206, the second expander 1210, and then the third expander 1214 before it exits the expander system 1200 close to the first temperature. The temperature is reduced at each successive stage. The three expander stages are on a single shaft and the assembly is called an expander train 1201. The shaft on expander train 1201 provides the connection to extract the work developed by the expanders.

Figure 13:
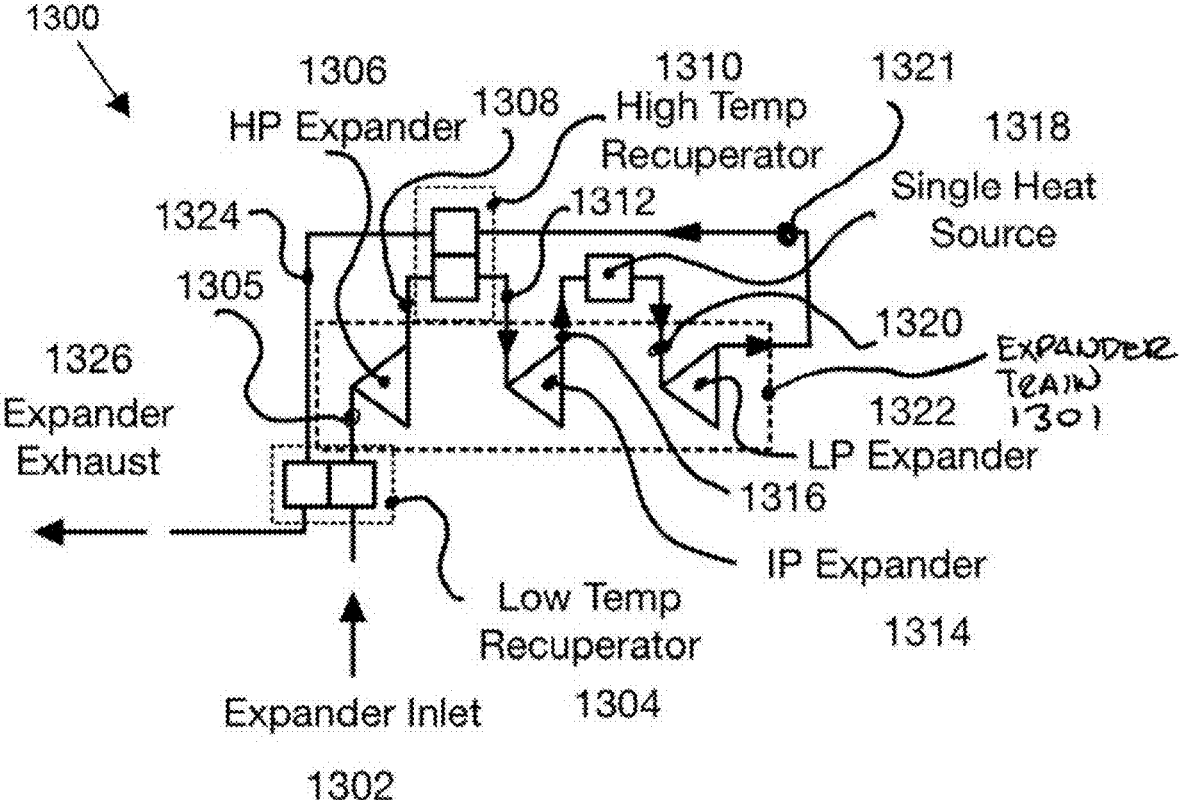
FIG. 13 is a schematic of a multi-stage expander system of an energy conversion cycle of an embodiment of the present disclosure, with single heat input at the inlet to the LP Expander and recuperation.

FIG. 13 is a schematic of an embodiment of a multi-stage expander 1300 that includes an inlet 1302, a first recuperator 1304, a first conduit 1305 that extends from the first recuperator 1304 to a first expander 1306, a second conduit 1308 that extends between the first expander 1306 and a second recuperator 1310, a third conduit 1312 that extends between the second recuperator 1310 and a second expander 1314, a third conduit 1316 that extends between the second expander 1314 and a heat source 1318, a fourth conduit 1320 that extends between the heat source 1318 and a third expander 1322, a fifth conduit 1321 that extends between the third expander 1322 and the second temperature recuperator 1310, a sixth conduit 1324 that extends between the second recuperator 1310 and the first recuperator 1304, and a seventh conduit 1324 that extends between the second recuperator 1310 and a first recuperator 1304, and an eighth conduit 1326 that extends between the first recuperator 1304 and an exhaust 1326.

In the multi-stage expander 1300, the heat source 1318 is arranged before an inlet of the third expander 1322, which is the last stage of gas expansion. The gas leaving the second expander 1314 at a first temperature enters the heat source 1318 and leaves at a second temperature which is substantially higher than the first temperature. The gas leaving the heater 1318 enters the final stage of expansion 1322. It exits the third expander 1322 at a second temperature lower than the first temperature but substantially higher than the first temperature, and passes through a low-pressure side of a second recuperator 1310 and then at a third temperature that is higher than the first temperature the low-pressure side of the first recuperator 1304. The first recuperator 1304 heats the gas entering the first expander 1306 and second recuperator 1310 heats the gas entering the second expander 1314. The gas on the low-pressure side leaving the first recuperator 1304 through the exhaust 1326 is close to the first temperature entering the first recuperator 1304 from the stored compressed gas. The three expander stages are on a single shaft and the assembly is called an expander train 1301. The shaft on expander train 1301 provides the connection to extract the work developed by the expanders.

Figure 14:
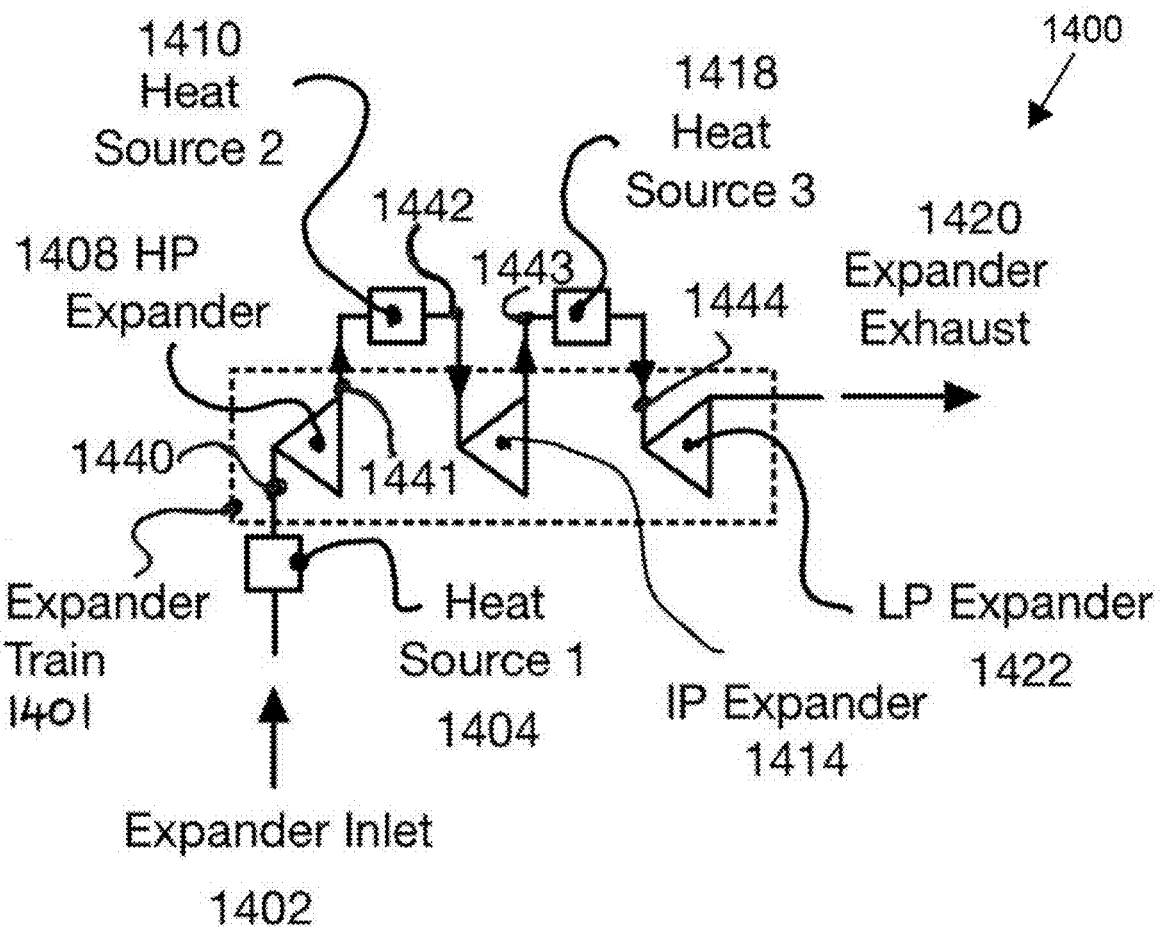
FIG. 14 is a schematic of a multi-stage expander system of an energy conversion cycle of an embodiment of the present disclosure, with heat input at the inlet to each stage of the expander.

FIG. 14 is a schematic of an embodiment of another multi-stage expansion system 1400, with heat sources arranged before each expander stage. The multi-stage expansion system 1400 includes an inlet 1402, a first heat source 1404, a conduit 1440 that connects the first heat source 1401 to the inlet of the first expander 1408, a first expander 1408, a conduit 1441 extending between the first expander 1408 and a second heat source 1410, a conduit 1442 that extends between the second heat source 1410 and a second expander 1414, a conduit 1443 that extends between an outlet of the second expander 1414 and an inlet of a third heat source 1418, a third conduit 1444 that extends between an outlet of the third heat source 1418 and an inlet of a third expander 1422, a third expander 1422, and a conduit 1420 where the air exhausts the system. Adding heat individually between each stage permits a matching temperature of heating resource to the stage pressure ratio. Using high temperatures with high stage pressure ratio provides higher energy density.

Gas at a first temperature enters the expansion system 1400 through expander inlet 1402 and leaves the expansion system 1400 through the exhaust 1420 at substantially the first temperature. Gas enters the inlet of the first heat source at a first temperature. The gas then leaves the first heater and enters the first expander 1408 at the second temperature which is substantially higher than the first temperature. The temperature of the gas exiting the first expander 1408 is close to the first temperature, where is heated by the second heat source 1410. The gas exits the second heat source 1410 at a third temperature matched to the second expander 1414. The gas then passes through the second expander 1414 and exits close to the first temperature. It then passes through a third heater 1418 and exits at a fourth temperature which is substantially higher than the first temperature and matched to the expander 1422. The gas then travels through the conduit 1444 and enters the third expander 1422. It leaves the third expander 1422 substantially at the first temperature, where it exhausts through conduit 1420. The three expander stages are on a single shaft and the assembly is called an expander train 1401. The shaft on expander train 1401 provides the connection to extract the work developed by the expanders.

Figure 15:
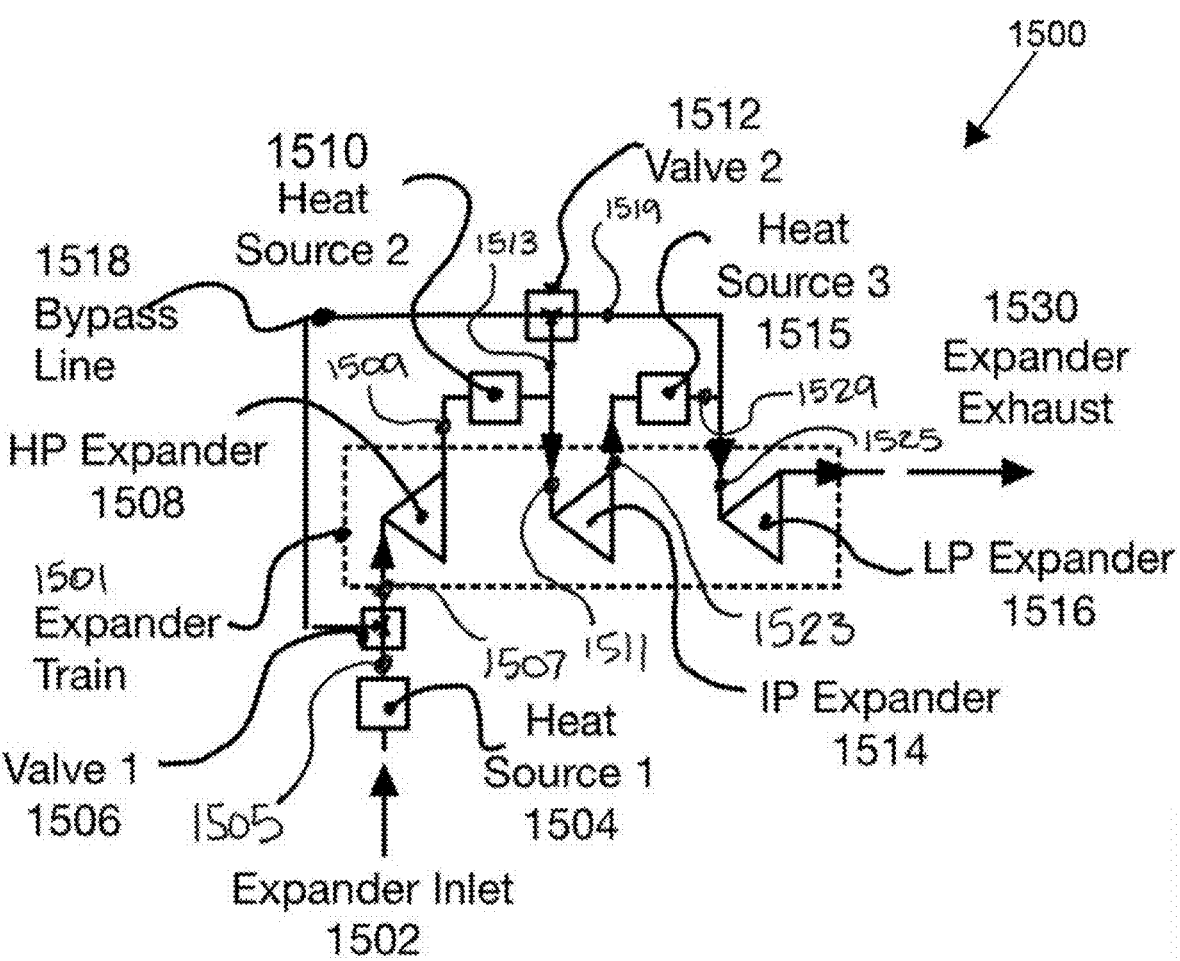
FIG. 15 is a schematic of a multi-stage expander system of an energy conversion cycle of an embodiment of the present disclosure, with heat input at the inlet of each stage of the expander and two expansion stage bypass modes.

FIG. 15 is an embodiment of a schematic of another multi-stage expansion system 1500 with heat sources arranged before each expander stage that can operate in three primary modes by activating two valves 1506, and 1512. The multi-stage expansion system 1500 includes an inlet 1502, a first heat source 1504, a first conduit 1505, a first valve 1506, a second conduit 1507, a first expander 1508, a third conduit 1509, a second heat source 1510, a fourth conduit 1511, a second expander 1514, a second valve 1512, a fifth conduit 1513 that extends between the second valve 1512 and the fourth conduit 1511, a sixth conduit 1523, a third heat source 1515, a seventh conduit 1525, a third expander 1516, a first bypass line 1518 that extends between a first valve 1506 and a second valve 1512, a second bypass line 1519 that extends between a second valve 1512 and a conduit 1525. Gas at a first temperature enters the first heat source 1504 at a first temperature and leaves the system 1500 through exhaust 1530 at substantially the same as the first temperature. The gas enters the individual heat sources 1506, 1510, and 1515, at a first temperature and leaves the individual heat sources at a second temperature that is substantially higher than the first temperature and matched to the following expander.

Gas enters the inlet to the first expander 1508 at the second temperature. The gas temperature exiting the first expander 1508 is close to the first temperature, where is heated by the second heat source 1512. The gas exits the second heat source 1512 at a substantially higher third temperature and matches the expander 1514. The gas then passes through the second expander 1514 and exits close to the first temperature. It then passes through the third heat source 1515 and exits at a substantially higher fourth temperature and matched to the expander 1516 and enters the third expander 1516. It leaves the third expander 1516 substantially at the first temperature. The first valve 1506 is arranged after the first heat source 1504 and immediately before the first expander 1508. The second valve 1520 is connected to the first valve 1506 by the bypass line 1518 to direct flow to either the inlet to the second expander 1514 by conduit 1513 or the inlet to third expander 1516 through conduit 1919.

In a first by-pass mode, the gas after exiting the first heat source 1504 at a second temperature is directed to the inlet of the second expander 1514. After exiting the second expander 1514 at the first temperature it enters the third heat source 1515 and exits at a higher third temperature and matched to expander 1516, before entering the third expander 1516. It leaves the third expander 1516 substantially at the first temperature.

In a second by-pass mode, the first valve 1506 and then the second valve 1520 direct the flow leaving the first heat source at a second temperature to the inlet of the third expander 1516. The gas exits the third expander 1516 substantially at the first temperature. Here the valves permit power generation to be adjusted by bypassing expander stages. By selecting the number of stages of expansion, and the output temperature of the heat sources, output power, efficiency and capacity can be optimized. The three expander stages are on a single shaft and the assembly is called an expander train 1501. The shaft on expander train 1501 provides the connection to extract the work developed by the expanders.

Although this invention has been disclosed in the context of certain embodiments and examples, it will be understood by those skilled in the art that the invention extends beyond the specifically disclosed embodiments to other alternative embodiments and/or uses of the invention and obvious modifications and equivalents thereof. It is to be understood that the phraseology or terminology employed herein is for the purpose of description and not of limitation. In addition, while several variations of the embodiments of the invention have been shown and described in detail, other modifications, which are within the scope of this invention, including, but not limited to, the substitutions of equivalent features, materials, or parts, will be readily apparent to those of skill in the art based upon this disclosure without departing from the spirit and scope of the invention.

What is claimed is:

1. A hydraulic compression system, comprising:
a compressor configured to compress gas entering the compression system;
an inlet system arranged in fluid communication with the compressor such that the gas is compressed prior to entering the inlet system by the compressor;
a first reservoir in fluid communication with the inlet system, downstream of the inlet system and vertically offset from the inlet system;
a second reservoir system arranged in fluid communication with the first reservoir system and upstream of the first reservoir system such that the first reservoir and the second reservoir are vertically offset from each other;
a pump configured to aid in circulation of liquid about the compression system between the second reservoir and the inlet system; and
a mixer head, which is part of the inlet system, that is configured to mix the liquid with the gas that has been compressed prior to mixture of the liquid and the gas being transferred to the last least one reservoir arranged vertically upstream from the second reservoir.

2. The hydraulic compression system of claim 1, wherein the compressor is in an open body of water.

3. The hydraulic compression system of claim 1, wherein the gas is admitted to the compressor at any pressure.

4. The hydraulic compression system of claim 1, wherein the compression system is a closed-loop system with liquid arranged therein.

5. The hydraulic compression system of claim 1, wherein the gas is air and the liquid is water.

6. The hydraulic compression system of claim 1, wherein the gas that is compressed prior to being admitted to the inlet system collects in a pocket within the inlet system, above liquid in the inlet system.

7. The hydraulic compression system of claim 1, wherein the compressed gas in inlet system is injected directly into the liquid in the inlet system.

8. The hydraulic compressor of claim 1, wherein the gas in inlet system is delivered directly at a pressure.

9. The hydraulic compression system of claim 1, wherein the gas in the compression system is at a pressure higher than ambient.

10. The hydraulic compression system of claim 1, wherein the gas in the compression system is at a pressure lower than ambient.

11. The hydraulic compression system of claim 1, further comprising a heat source and at least one expander train in fluid communication with the inlet system.

12. A hydraulic compression system, comprising:
a compressor configured to compress gas entering the compression system;
an inlet system arranged in fluid communication with the compressor such that the gas entering the inlet system is the gas that has been compressed;
a first reservoir in fluid communication with the inlet system, downstream of the inlet system and vertically offset from the inlet system;
a second reservoir in fluid communication with the first inlet system and upstream of the first reservoir system such that the first reservoir and the second reservoir are vertically offset from each other;
a second reservoir system arranged in fluid communication with the first reservoir system and upstream of the first reservoir system such that the first reservoir and the second reservoir are offset from each other;
a pump configured to aid in in circulation of liquid about the compression system between the second reservoir and the inlet system; and
a mixer head, which is part of the inlet system, that is configured to mix the liquid with the gas that has been compressed prior to mixture of the liquid and the gas being transferred to the last least one reservoir arranged vertically upstream from the second reservoir.

13. The hydraulic compression system of claim 12, wherein the gas in the compression system is at a pressure higher than ambient.

14. The hydraulic compression system of claim 12, wherein the gas in the compression system is at a pressure lower than ambient.

15. The hydraulic compression system of claim 12, wherein the gas that has been compressed by the compressor is resides in the inlet system in a volume above the liquid.

16. The hydraulic compression system of claim 12, wherein the gas that has been compressed by the compressor is injected directly into the liquid in the inlet system.

17. The hydraulic compression system of claim 12, wherein the gas that has been compressed is admitted at a pressure to the inlet system.

18. The hydraulic compression system of claim 12, wherein the second reservoir is open to atmosphere.

19. The hydraulic compression system of claim 12, wherein the gas is air and the liquid is water.

* * * * *